United States Patent [19]
Nakagawa

[11] Patent Number: 5,334,894
[45] Date of Patent: Aug. 2, 1994

[54] ROTARY PULSE MOTOR

[75] Inventor: Hiroshi Nakagawa, Ise, Japan

[73] Assignee: Shinko Electric Co., Ltd., Tokyo, Japan

[21] Appl. No.: 882,472

[22] Filed: May 13, 1992

[51] Int. Cl.⁵ ............................................. H02K 37/14
[52] U.S. Cl. .................................. 310/49 R; 310/156; 310/112
[58] Field of Search .............. 310/49 R, 114, 154, 310/156, 185, 254, 112; 901/23, 24

[56] References Cited

U.S. PATENT DOCUMENTS

| | | | |
|---|---|---|---|
| 2,230,007 | 6/1941 | Nowosielski | 310/70 R |
| 4,306,164 | 12/1981 | Itoh et al. | 310/49 R |
| 4,629,916 | 12/1986 | Oudet | 310/49 R |
| 4,680,494 | 7/1987 | Grosjean | 310/156 |
| 4,739,201 | 4/1988 | Brigham et al. | 310/49 R |
| 4,823,038 | 4/1989 | Mizutani et al. | 310/257 |
| 4,899,072 | 2/1990 | Ohta | 310/49 R |
| 4,920,294 | 4/1990 | Christiaens et al. | 310/162 |
| 4,972,109 | 11/1990 | Kakizaki et al. | 310/49 A |
| 5,010,262 | 4/1991 | Nakagawa et al. | 310/12 |
| 5,130,595 | 7/1992 | Arora | 310/268 |

FOREIGN PATENT DOCUMENTS 2151256 6/1990 Japan.
3124254 5/1991 Japan.

Primary Examiner—Steven L. Stephan
Assistant Examiner—Judson H. Jones
Attorney, Agent, or Firm—Carothers & Carothers

[57] ABSTRACT

In a rotary pulse motor including: a cylindrical stator made of magnetic material; a cylindrical rotor made of magnetic material and inserted concentrically into the cylindrical stator and being rotatably supported; slit-like grooves formed at a regular angular pitch P/2 in a peripheral portion of the cylindrical rotor, teeth formed between the slit-like grooves permanent magnets inserted into the slit-like grooves and so arranged that polarities of the teeth are alternately inverted; magnetic poles formed at a regular angular pitch in the cylindrical stator facing to the teeth at a constant air gap, and coils provided on the cylindrical stator so as to a generate magnetic flux through the air gap, the cylindrical stator consists of two cylindrical members arranged in the axial direction of the cylindrical rotor and the magnetic-poles include two rows of magnetic poles formed on the cylindrical stator, the magnetic poles in the respective rows being angularly shifted from each other a predetermined pitch of P/2.

18 Claims, 41 Drawing Sheets

Prior Art FIG.1
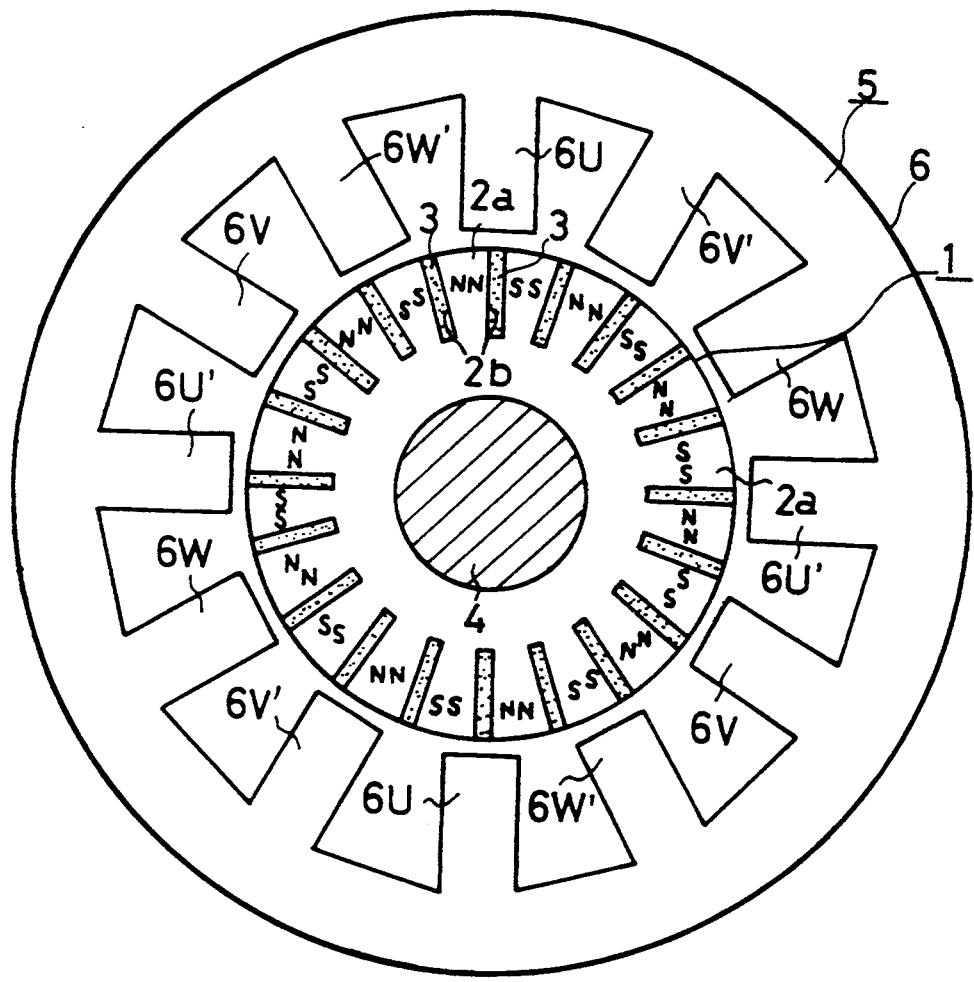
Prior Art FIG.2
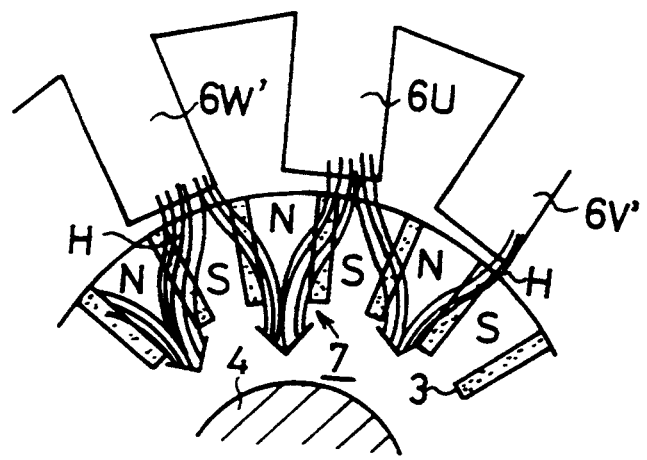

Prior Art FIG.3
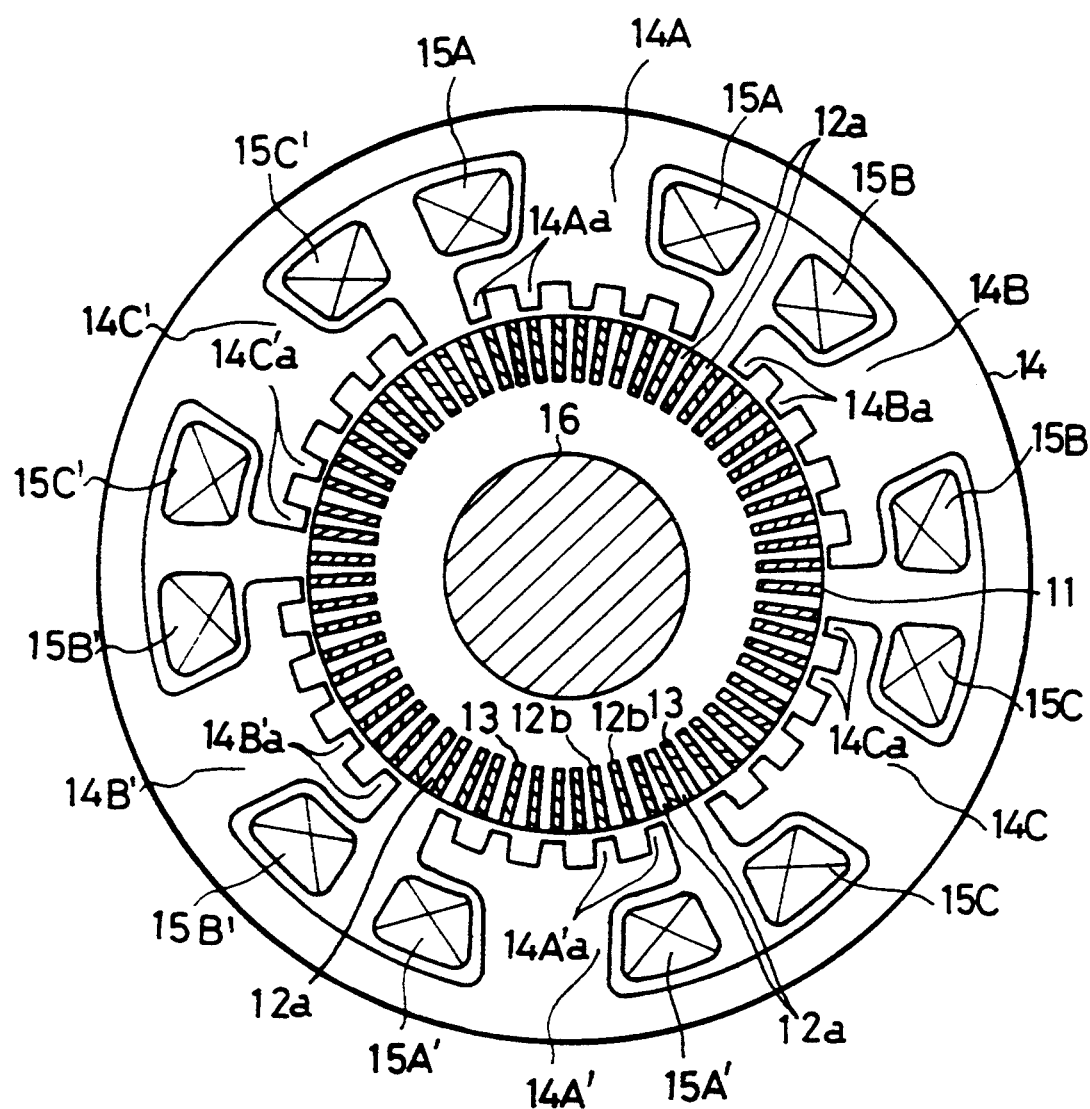

Prior Art  FIG. 4
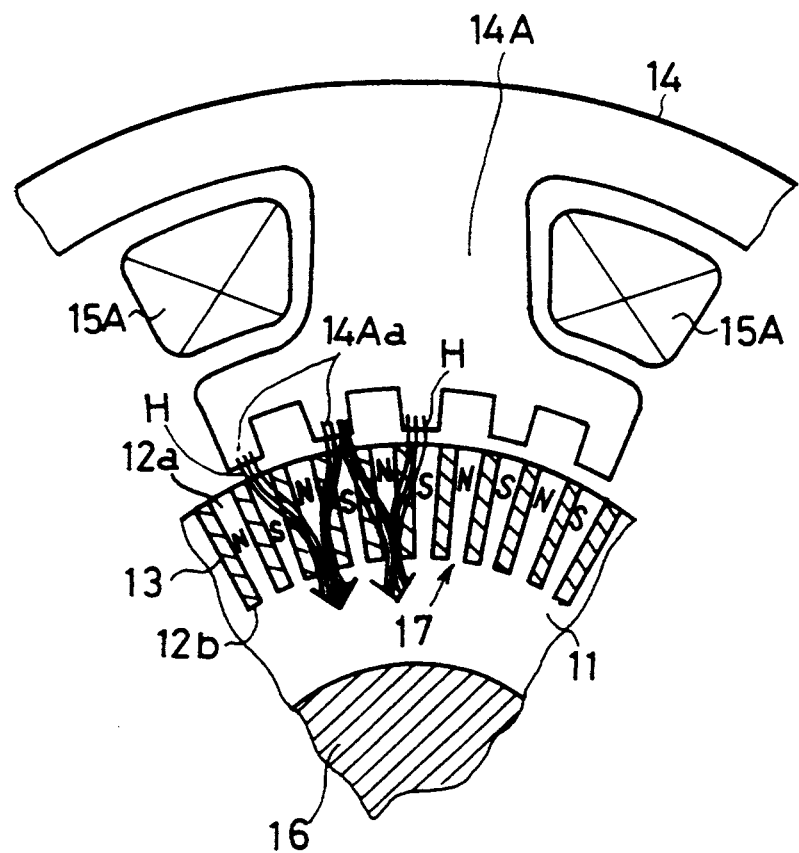

Prior Art  FIG. 5
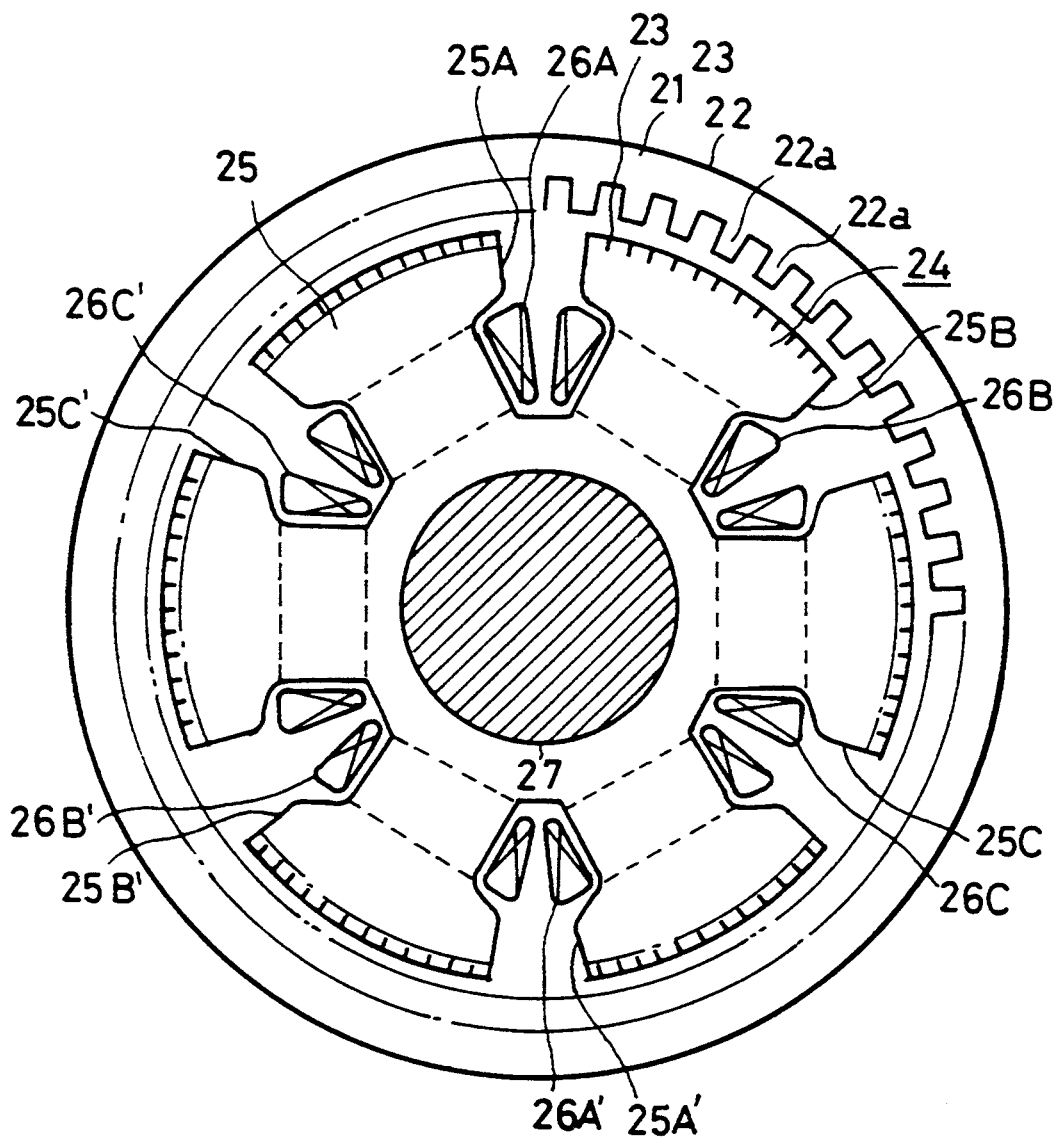

Prior Art   FIG.6
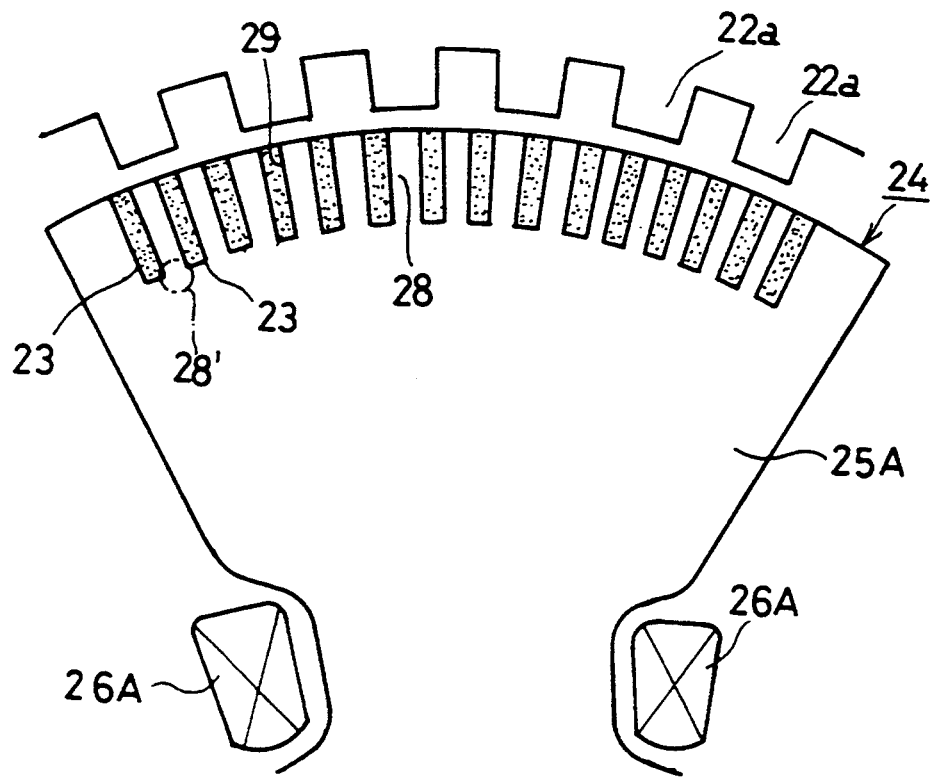

F I G. 11
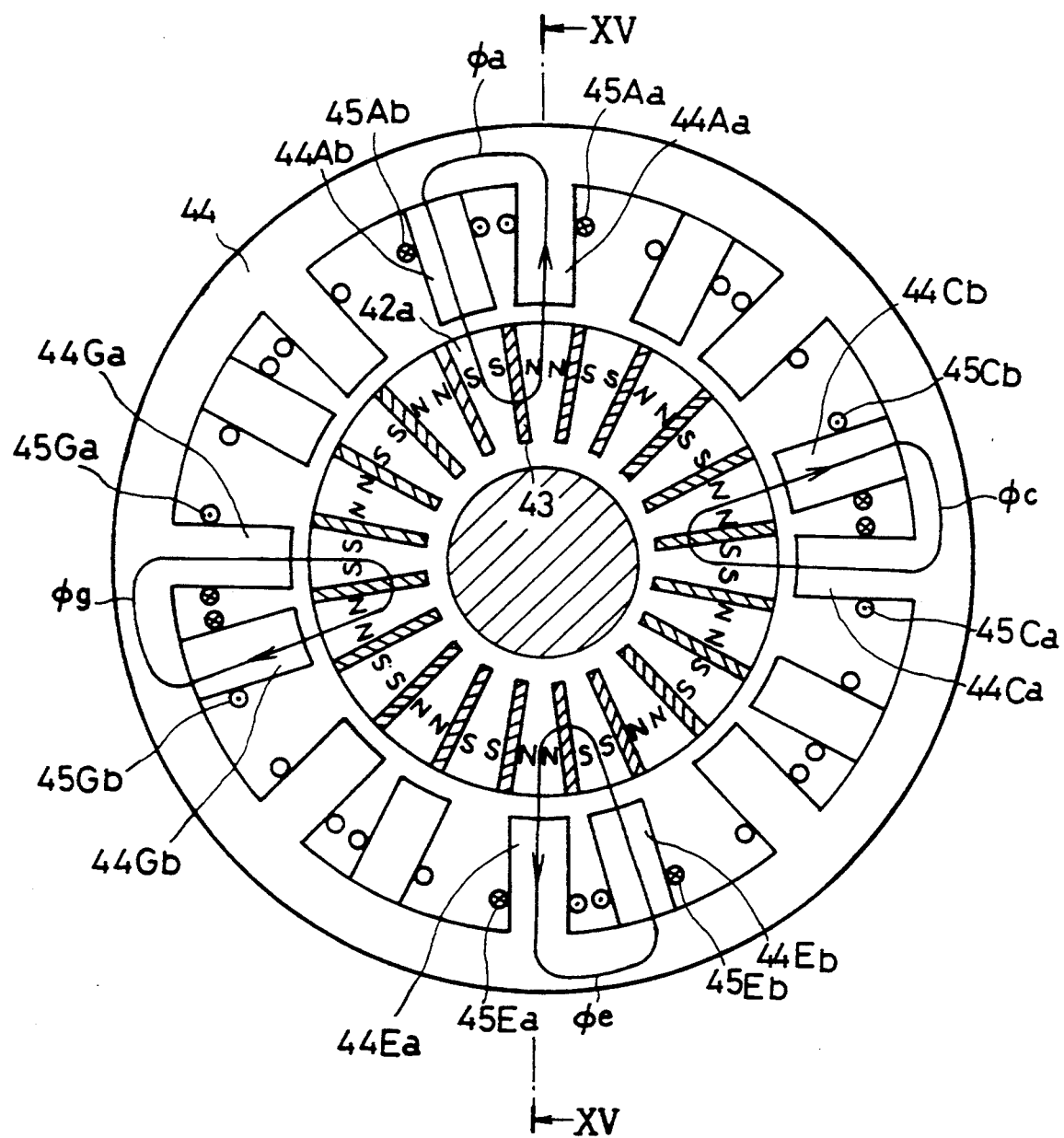

ROTARY PULSE MOTOR

BACKGROUND OF THE INVENTION

1. Field of the Invention

This invention relates to a rotary pulse motor most suitable for FA (Factory Automation) machine such as an industrial robot for which a relatively large torque is required.

2. Description of the Prior Art

FIG. 1 shows a first prior art rotary pulse motor which this Applicant previously developed. A cylindrical rotor 1 is made of magnetic material. Slit-like grooves 2b, 2b—are formed at an angular regular pitch in the peripheral portion of the rotor 1.

Thus, teeth 2a, 2a—are formed between the slit-like grooves 2b, 2b—, respectively. Permanent magnets 3, 3—are inserted into the slit-like grooves 2b, 2b—. A shaft 4 is fixed to a central hole of the rotor 1, and it is rotatably supported.

Pairs of magnetic poles (6U, 6U), (6V', 6V'), (6W, 6W),(6U', 6U'),(6V, 6V) and (6W', 6W') are formed in symmetry with respect to the axis or shaft 4, in the inner peripheral portion of a cylindrical stator 5 made of magnetic material. Not-shown coils are wound on the magnetic poles 6U to 6W'.

Pulse currents are, in turn, supplied to the coils. The rotor 1 is rotated stepwisely. The principle of the operation of the rotary pulse motor is described in detail, in the Japanese Patent Application No. 260923/1989.

Generally, such a rotary pulse motor is controlled in an open-loop manner, and so can position apparatus with high accuracy. Accordingly, it is used for driving a carriage in a printer which is one example of the FA machine. However, the torque is not so large as satisfactory. It is not suitable for the FA machine such as industrial robot for which a relatively large torque is required. The reason is as follows The teeth 2a, 2a extend in radial directions. Accordingly, areas of magnetic paths through which magnetic fluxes H flow, are narrower towards the center of the rotor 1 or the shaft 4, as shown in FIG. 2. The portions 7 of the teeth 2a, 2a, 2a—facing to the inner ends of the permanent magnets 3 are narrowest. The amount of the magnetic flux is limited. It cannot be larger than the saturable flux amount. Thus, a torque cannot be larger than the torque corresponding to the saturated flux amount.

FIG. 3 shows a second prior art rotary pulse motor which was developed by this Applicant and of a three-phase type and an inner-rotor type.

A cylindrical rotor 11 made of magnetic material is fixed to a shaft 16 at its central hole. As the first prior art rotary pulse motor of FIG. 1, teeth 12a, 12a—and slit-like grooves 12b, 12b—are alternately formed at an angular regular pitch in the peripheral portion of the rotor 11. Permanent magnets 13, 13—are inserted into the slit-like grooves 12b, 12b—.

Six magnetic poles 14A, 14B, 14C, 14A', 14B', 14C' are formed at an angular regular pitch in the inner peripheral portion of a cylindrical stator 14 made of magnetic material. The magnetic poles 14A', 14B' and 14C' are excited in opposite polarity to the magnetic poles 14A, 14B and 14C, respectively. Coils 15A, 15B, 15C, 15A', 15B' and 15C' are wound on the magnetic poles 14A, 14B,—14C', respectively. Magnetic teeth 14Aa, 14Ba, 14Ca, 14A'a, 14B'a and 14C'a are formed in the top end portions of the magnetic poles 14A, 14B, 14C, 14A', 14B' and 14C', respectively. Pulse currents in opposite polarities are supplied to the coils 15A, 15A' for A-phase and A'-phase, coils 15B, 15B' for B-phase and B'-phase and coils 15C and 15C' for C-phase and C'-phase.

However, there is the same problem in this rotary pulse motor, as in the first prior art rotary pulse motor of FIG. 1.

As shown in FIG. 4, paths for magnetic fluxes H are narrower towards the axis or shaft 16 of the rotor 11. Thus, an obtained torque not so large as satisfactory.

FIG. 5 shows a third prior art rotary pulse motor which was developed by this Applicant and of three-phase type and outer-rotor type. Magnetic teeth 22a, 22a—are formed at an angular regular pitch in an inner surface of a cylindrical rotor 21 made of magnetic material. Magnetic poles 25A for A-phase, 25B for B-phase, 25C for C-phase, 25A' for A'-phase, 25B' for B'-phase and 25C' for C'-phase are formed at an angular regular pitch in a peripheral portion of a cylindrical stator 24 made of magnetic material. Coils 26A, 26B, 25C, 26A', 26B' and 26C' are wound on the magnetic poles 25A, 25B, 25C, 25A', 25B' and 25C', respectively. The magnetic poles 25A', 25B' and 25C' are energized in opposite polarity to the magnetic poles 25A, 25B and 25C.

Teeth 28, 28—and slit-like grooves 29, 29 are formed alternately at an angular regular pitch in top end surfaces of the magnetic poles 25A, 25B, 25C, 25A', 25B' and 25C', respectively (FIG. 6). Permanent magnets 23 are inserted into the slit-like grooves 29 so that the teeth 28, 28 are polarized alternately in opposite polarity. A shaft 27 is fixed to the stator 24 at the central hole.

Pulse currents are, in turn, supplied to the coils 26A, 26B, 26C, 26A', 26B' and 26C'. The secondary rotor 21 is rotated stepwisely by the well-known principle which is described in detail, in the Japanese Patent Application No. 301965/1988.

This prior art rotary pulse motor has the same disadvantage as the above-described rotary pulse motors of FIG. 1 and FIG. 3.

As clearly shown in FIG. 6, the teeth 28, 28—and the permanent magnets 23, 23 —extend in the radial directions. Accordingly, the areas of the magnetic paths are narrowest at the portions 28' of the teeth 28, 28 —corresponding to the inner ends of the permanent magnets 23, 23—. The amounts of the magnetic fluxes are limited there. When the amount of the magnetic flux is larger there than a predetermined value, the magnetic fluxes are saturated. A larger torque cannot be obtained.

Further, since the six coils are required in accordance with the number of the magnetic poles, the weight of the rotary pulse motor is large, and its cost is high.

It is troublesome to mount the coils arround the magnetic poles, and it requires much labor and time.

Since the space factor cannot be large, the winding operation of the coils requires much time and labor.

SUMMARY OF THE INVENTION

Accordingly, it is an object of this invention to provide a rotary pulse motor which can generate a larger torque.

Another object of this invention is to provide a rotary pulse motor which can be more easily manufactured.

A further object of this invention is to provide a rotary pulse motor which is lower in cost.

In accordance with an aspect of this invention, a rotary pulse motor comprises: (A)a first cylindrical magnetic-path forming means made of magnetic material ; (B)a second cylindrical magnetic-path forming means made of magnetic material and inserted concentrically into said first cylindrical magnetic-path forming means, said first cylindrical magnetic-path forming means or said second cylindrical magnetic-path forming means being rotatably supported ; (C)slit-like grooves formed at a regular angular pitch P/2 in a peripheral portion of one of said first and second cylindrical magnetic-path forming means; (D)teeth formed between said slit-like grooves; (E)permanent magnets inserted into said slit-like grooves and so arranged that polarities of said teeth are alternately inverted; (F)magnetic-pole means formed at a regular angular pitch of P/2, in the other of said first and second cylindrical magnetic-path forming means, said magnetic pole means facing to said teeth at a constant air gap, and (G)coil means provided on said first cylindrical magnetic-path forming means or said second cylindrical magnetic-path forming means so as to be operable for generating magnetic flux through said air gap, the improvements in which one of said first and second cylindrical magnetic-path forming means comprises plural cylindrical members arranged in the axial direction of the other of said first and second cylindrical magnetic-path forming means, and said magnetic-pole means comprises plural rows of circumferentially spaced magnetic poles formed on said plural cylindrical members, respectively, said magnetic poles in the respective rows being angularly shifted from one another by said angular pitch of P/2.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 1 is a schematic front view of a first prior art rotary pulse motor;

FIG. 2 is an enlarged front view of a part of the rotary pulse motor of FIG. 1 for explaining the problem thereof.

FIG. 3 is a schematic front view of a second prior art rotary pulse motor;

FIG. 4 is an enlarged front view of a part of the rotary pulse motor of FIG. 3 for explaining the problem thereof.

FIG. 5 is a schematic front view of a third prior art rotary pulse motor;

FIG. 6 is an enlarged front view of a part of the rotary pulse motor of FIG. 5 for explaining the problem thereof.

FIG. 11 is a schematic front view of the rotary pulse motor of FIG. 7 for explaining the operations thereof, in which one group of the coils is energized in one current direction;

DESCRIPTION OF THE PREFERRED EMBODIMENTS

Figure 7:
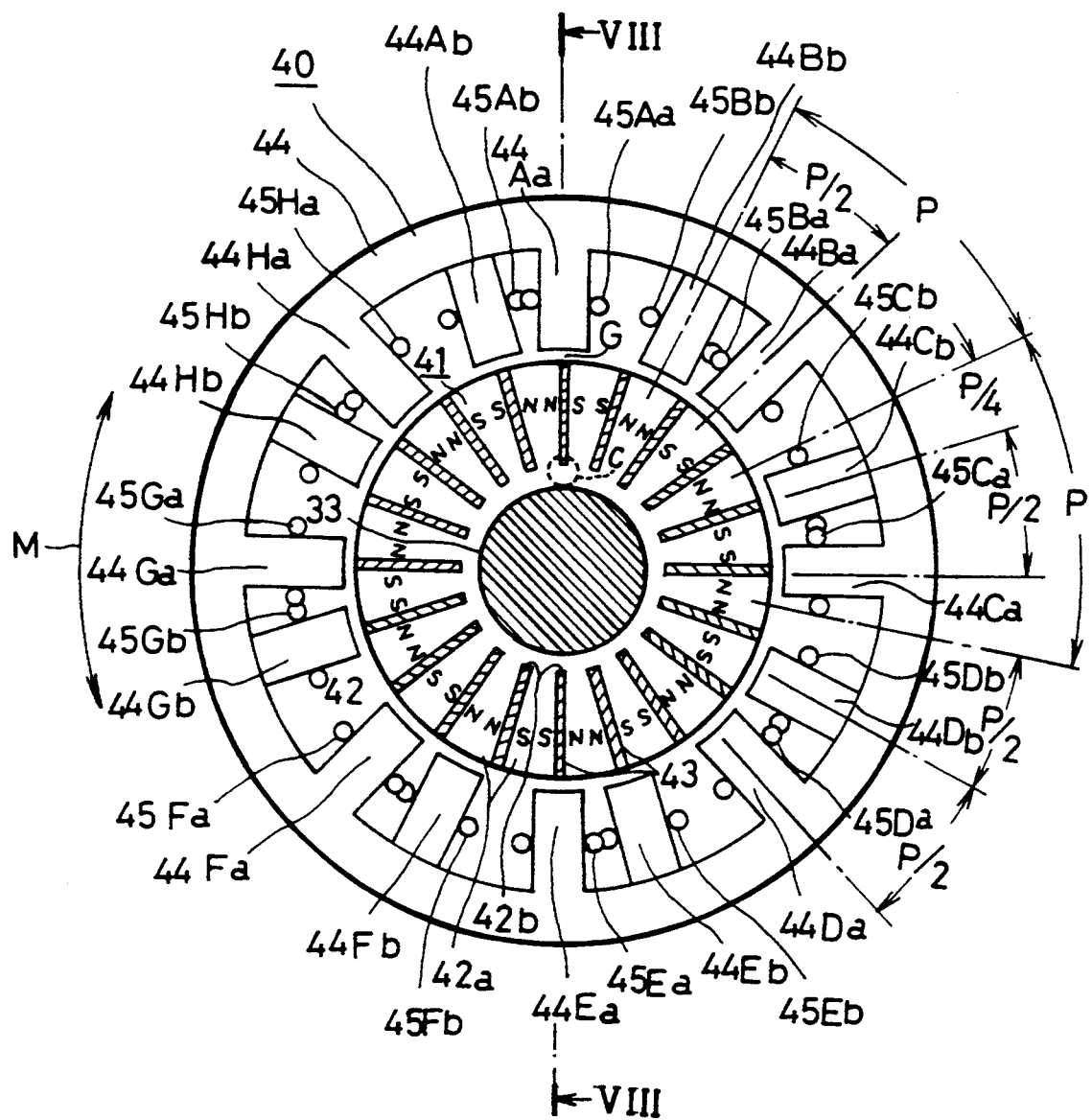
FIG. 7 is a schematic front view of a rotary pulse motor according to a first embodiment of this invention.

FIG. 7 shows a rotary pulse motor according to a first embodiment of this invention.

A cylindrical rotor 41 (secondary) made of magnetic material is inserted concentrically into a cylindrical stator 40 (primary) made of magnetic material. A shaft 33 made of magnetic material is fixed to a central hole of the rotor 41, and it is rotatably supported by not-shown bearings. The rotor 41 can be rotated in directions shown by an arrow M. Teeth 42a, 42a—and slit-like grooves 42b, 42b—are formed alternately at an angular regular pitch P/2 in a peripheral portion of the rotor 41. Permanent magnets 43 are inserted into the slit-like grooves 42b, 42b—so that the teeth 42a, 42a—are magnetized alternately in opposite so that the teeth of like polarity are spaced at an angular pitch P polarities.

Figure 8:
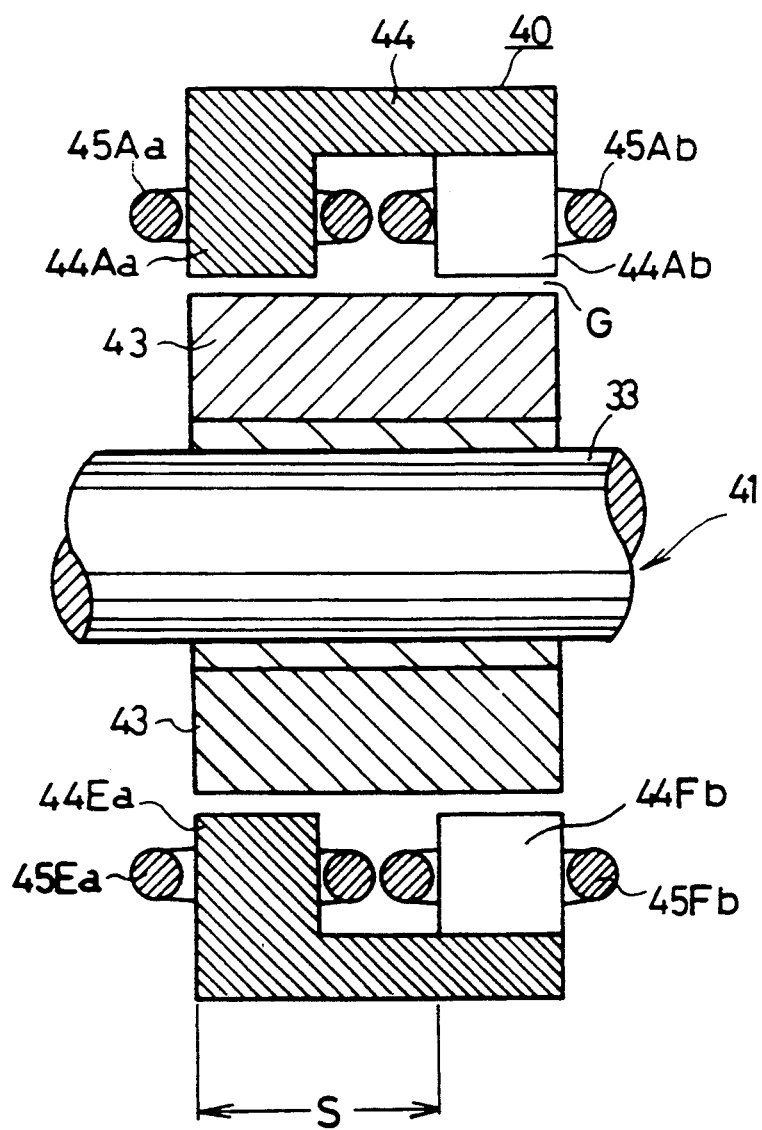
FIG. 8 is a cross-sectional view taken along the line VIII—VIII in FIG. 7.

A first row of magnetic poles 44Aa, 44Ba, 44Ca, 44Da, 44Ea, 44Fa, 44Ga and 44Ha and a second row of magnetic poles 44Ab, 44Bb, 44Cb, 44Db, 44Eb, 44Fb, 44Gb and 44Hb are formed in an inner periphery of an iron core 44 constituting the stator 40. Coils 45Aa, 45Ba, 45Ca, 45Da, 45Ea, 45Fa, 45Ga and 45Ha are wound on the magnetic poles 44Aa, 44Ba, 44Ca, 44Da, 44Ea, 44Fa, 44Ga and 44Ha, respectively, while coils 45Ab, 45Bb, 45Cb, 45Db, 45Eb, 45Gb and 45Hb are wound on the magnetic poles 44Ab, 44Bb, 44Cb, 44Db, 44Eb, 44Fb, 44Gb and 44Hb, respectively. The stator 40 consists of the iron core 44 and the coils 45Aa to 45Ha, 45Ab to 45Hb. The magnetic poles 44Aa to 44Ha, 44Ab to 44Hb are facing to the rotor 41 at a constant air gap G. As noted, the pitch of the teeth 42a magnetized in the same polarity is equal to P. Accordingly, the magnetic poles 44Ba, 44Ca, 44Da, 44Ea, 44Fa, 44Ga and 44Ha are arranged at the phase differences P/4, 2P/4, 3P/4, 0, P/4, 2P/4 and 3P/4 with respect to the magnetic pole 44Aa. The phase difference between the respective pairs of adjacent magnetic poles 44Aa and 44Ba, 44Ba and 44Ca, and so forth, is 90 degrees. Similarly, the phase difference between the respective pairs of adjacent magnetic poles 44Ab and 44Bb, 44Bb and 44Cb, and so forth is 90 degrees in the second row. The first row of the magnetic poles 44Aa to 44Ha is shifted by a predetermined length s from the second row of the magnetic-poles 44Ab to 44Hb in the axial direction, as shown in FIG. 8, and the phase difference between the former and the latter is equal to P/2.

The coil 45Aa and 45Ab are wound in such a direction that magnetic fluxes in opposite directions are generated in the magnetic poles 44Aa and 44Ab, respectively. Similarly, coils 45Ba and 45Bb, 45Ca and 45Cb and so forth thorugh 45Ha and 45Hb are wound in such a direction that magnetic forces in opposite directions are generated in the magnetic poles 44Ba and 44Bb, and so forth through 44Ha and 44Hb, respectively.

When no current is supplied to all of the coils 45Aa to 45Ha and 45Ab to 45Hb, the magnetic circuits are short-circuited in the inner-most magnetic-loops formed between the N-polarity of the permanent magnets 43 and the S-polarity thereof, as shown by the dotted line c representatively with respect to the magnetic pole 44Aa in FIG. 7.

Figure 9:
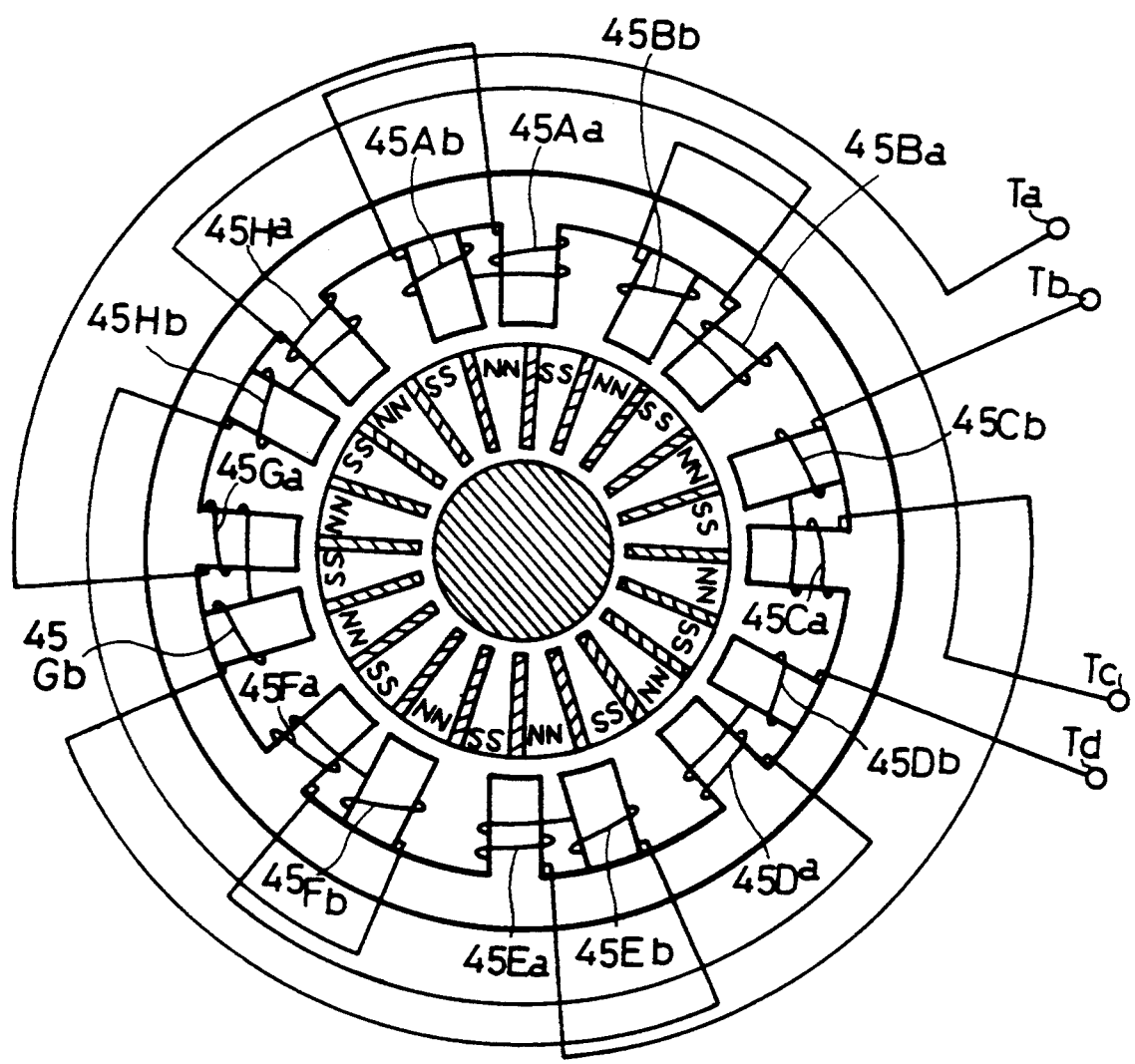
FIG. 9 is a schematic front view of the rotary pulse motor of FIG. 7 for showing coil windings.

The coils 45Aa to 45Ha and 45Ab to 45Hb are connected in the manner shown in FIG. 9. Terminals Ta and Tb are connected to the paired magnetic poles 45Aa and 45Ab, 45Ca and 45Cb, 45Ea and 45Eb and 45Ga and 45Gb. Terminals Tc and Td are connected to the paired magnetic poles 45Ba and 45Bb, 45Da and 45Db, 45Fa and 45Fb and 45Ha and 45Hb.

A pulse current is supplied alternately through the terminals Ta and Tb, and Tc and Td. Thus, the rotary pulse motor is driven in one-phase excitation method.

Figure 15:
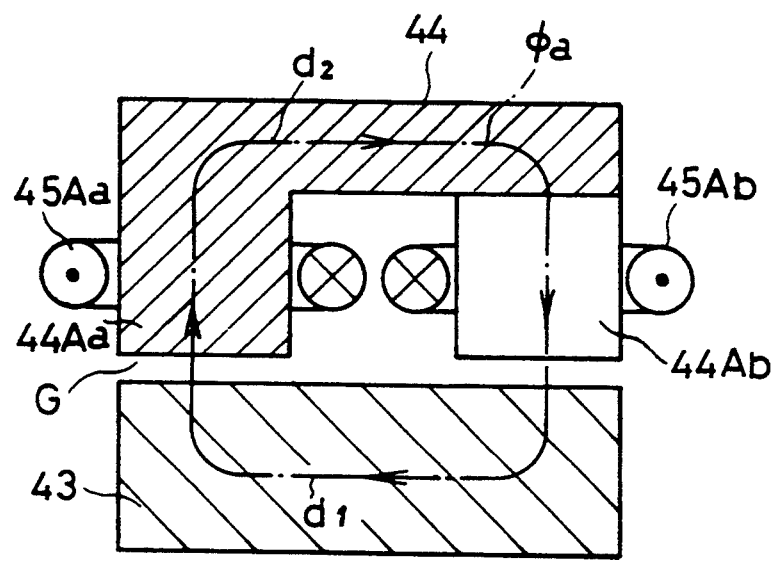
FIG. 15 is an enlarged cross-sectional view, taken along the line XV—XV in FIG. 11, for explaining the magnetic flux loop when energized

(1) As shown in FIG. 11, a predetermined current is supplied to the paired coils 45Aa and 45Ab, 45Ca and 45Cb, 45Ea and 45Eb, and 45Ga and 45Gb, in the direction shown by the marks (x) and (.), through the terminals Ta and Tb. As well-known, the mark (x) means that the current flows from the front of the drawing paper towards the back thereof, and the mark (.) means that the current flows from the back of the drawing paper towards the front thereof. Main magnetic flux loops $\phi a$, $\phi c$, $\phi e$, and $\phi g$ are formed between the stator 40 and the rotor 41, as shown in FIG. 11. In the magnetic flux loop $\phi a$, the magnetic flux flows through the path formed by the magnetic-pole 44Ab of the iron core 44→air gap→the S-polarized teeth 42a of the rotor 41→the permanent magnet 43→the N-polarized teeth 42a the rotor 41 adjacent to the same S-polarized teeth 42a→an axial path $d_1$ as shown in FIG. 15→air gap G→the magnetic pole 44Aa→another axial path $d_2$ as shown in FIG. 15→and the magnetic pole 44Ab. The other magnetic flux loops $\phi c$, $\phi e$ and $\phi g$ are formed in the similar manner. As the result, the rotor 41 takes such a magnetically stable position that the end surfaces of the magnetic-poles 44Aa, 44Cb, 44Ea and 44Gb are directly facing to the end surfaces of the N-polarized teeth 42a of the rotor 41, and the end surfaces of the magnetic poles 44Ab, 44Ca, 44Eb and 44Ga are directly facing to the end surfaces of the S-polarized teeth 42a of the rotor 41.

Figure 12:
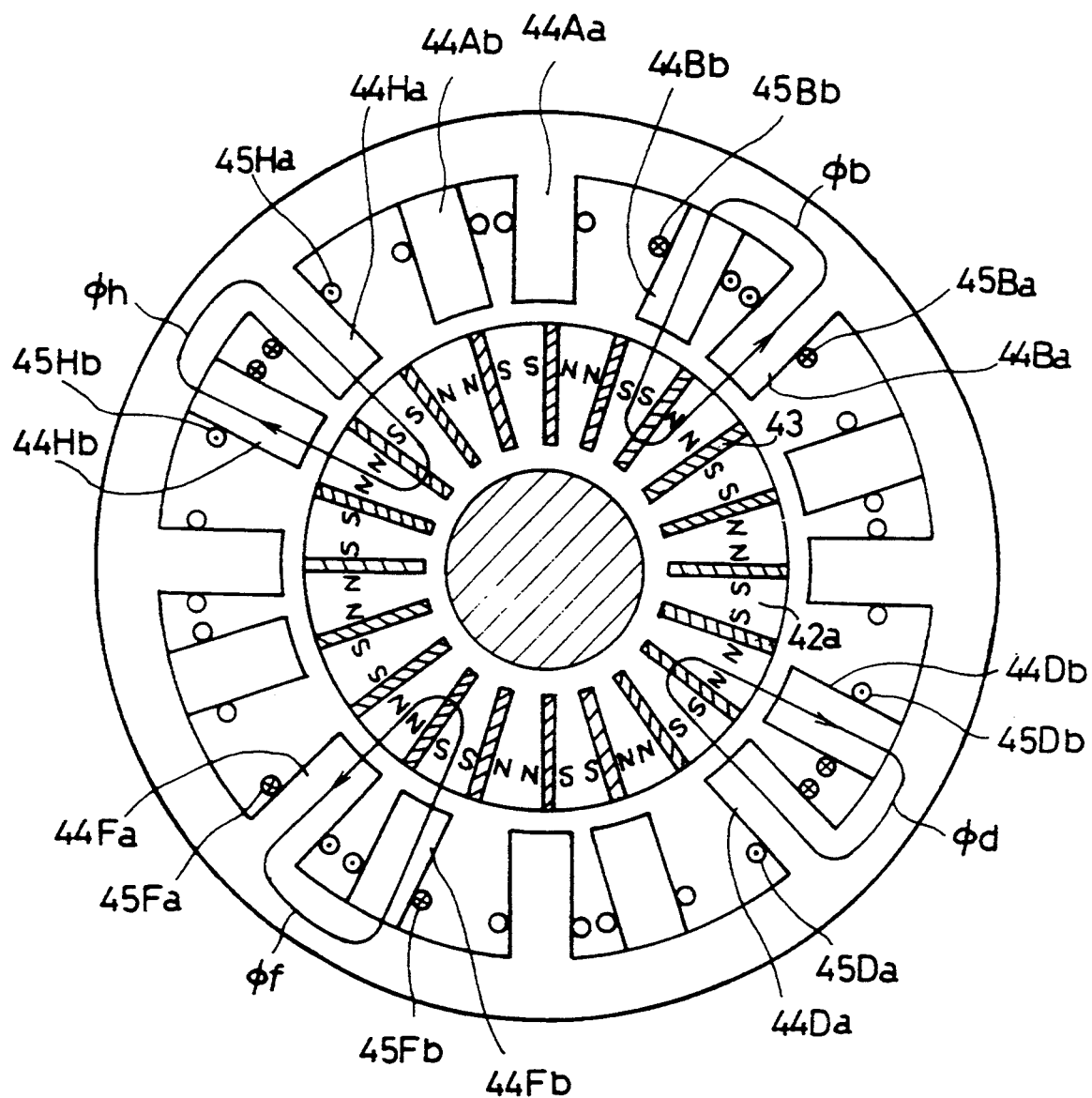
FIG. 12 is a schematic front view of the rotary pulse motor of FIG. 7 for explaining the operations thereof, in which another group of the coils is energized in one current direction.

(2) As shown in FIG. 12, a predetermined current is supplied to the paired coils 45Ba and 45Bb, 45Da and 45Db, 45Fa and 45Fb, and 45Ha and 45Hb, in the direction shown by the marks ( x ) and (.), through the terminals Tc and Td. Main magnetic flux loops $\phi b$, $\phi d$, $\phi f$, and $\phi h$ are formed between the stator 40 and the rotor 41, as shown in FIG. 12. In the magnetic flux loop $\phi b$, the magnetic flux flows through the path as the magnetic-pole 44Bb of the iron core 44→air gap G→the S-polarized teeth 42a of the rotor 41"the permanent magnet 43"the N-polarized teeth 42a of the rotor 41 adjacent to the same S-polarized teeth 42a→an axial path as shown in FIG. 15→air gap G→the magnetic pole 44Ba→another axial path as shown ion FIG. 15→the magnetic pole 44Bb. The other magnetic flux loops $\phi d$, $\phi f$ and $\phi h$ are formed in the similar manner. As the result, the rotor 41 takes such a magnetically stable position that the end surfaces of the magnetic-poles 44Ba, 44Db, 44Fa and 44Hb are directly facing to the end surfaces of the N-polarized teeth 42a of the rotor 41, and the end surfaces of the magnetic poles 44Bb, 44Da, 44Fb and 44Ha are directly facing to the end surfaces of the S-polarized teeth 42a of the rotor 41.

Figure 13:
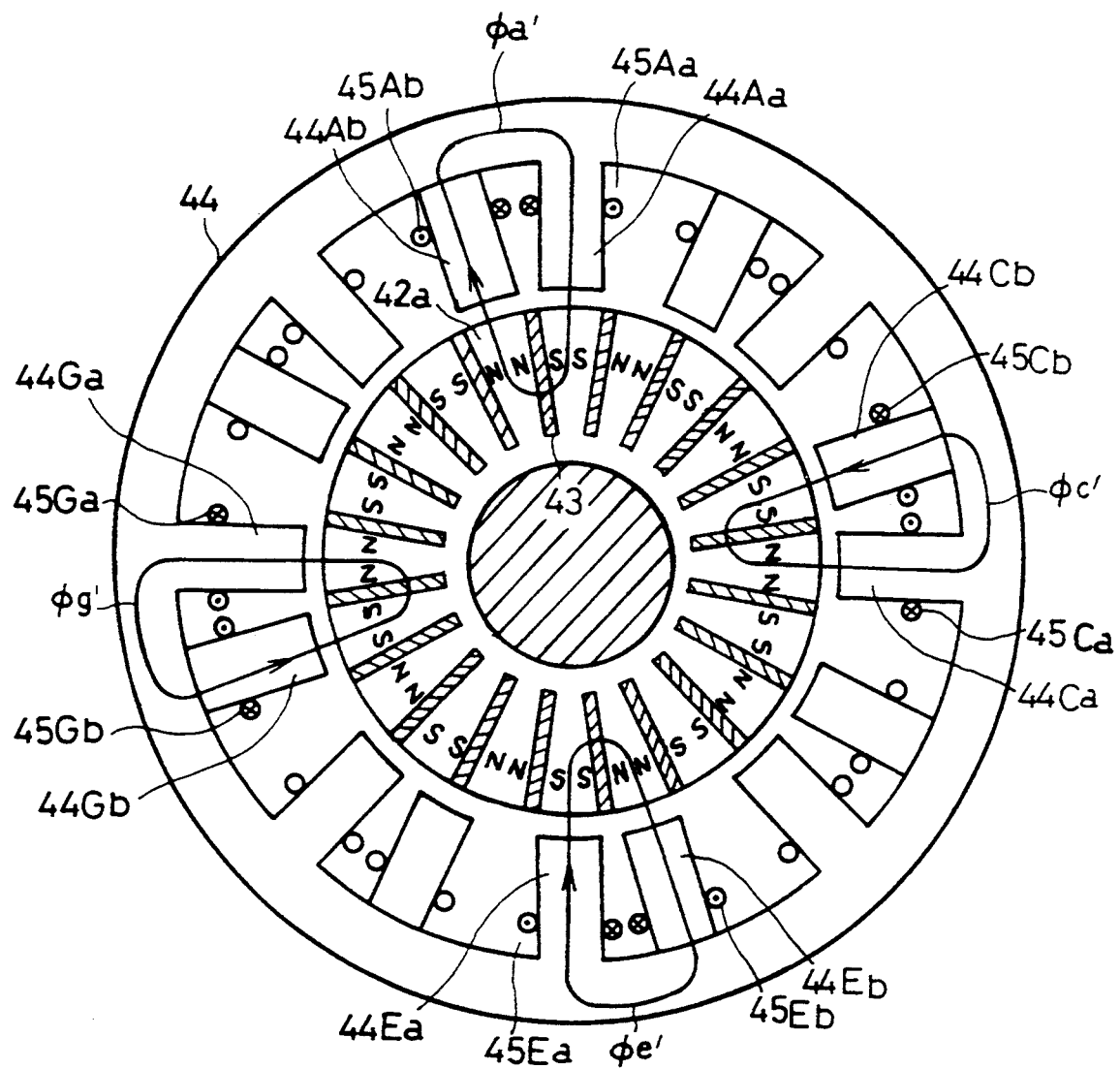
FIG. 13 is a schematic front view of the rotary pulse motor of FIG. 7 for explaining the operations thereof, in which the one group of the coils is energized in the other current direction.

(3) As shown in FIG. 13, a predetermined current is supplied to the paired coils 45Aa and 45Ab, 45Ca and 45Cb, 45Ea and 45Eb, and 45Ga and 45Gb, in the direction shown by the marks (x ) and (.), through the terminals Ta and Tb. Main magnetic flux loops $\phi a'$, $\phi c'$, $\phi e'$, and $\phi g'$ are formed between the stator 40 and the rotor 41, as shown in FIG. 13. In the magnetic flux loop $\phi a'$, the magnetic flux flows in the opposite direction to the magnetic flux loop $\phi a$. It flows through the path as the magnetic-pole 44Aa of the iron core 44→air gap G→the S-polarized teeth 42a of the rotor 41→the permanent magnet 43→the N-polarized teeth 42a of the rotor 41 adjacent to the same S-polarized teeth 42a→axial path→air gap G→the magnetic pole 44Ab→an axial path as shown in FIG. 15 (but in opposite direction)→ the magnetic pole 44Aa. The other magnetic flux loops $\phi c'$, $\phi e'$ and $\phi g'$ are formed in the similar manner. As the result, the rotor 41 takes such a magnetically stable position that the end surfaces of the magnetic-poles 44Aa, 44Cb, 44Ea and 44Gb are directly facing to the end surfaces of the S-polarized teeth 42a of the rotor 41, and the end surfaces of the magnetic poles 44Ab, 44Ca, 44Eb and 44Ga are directly facing to the end surfaces of the N-polarized teeth 42a of the rotor 41.

Figure 14:
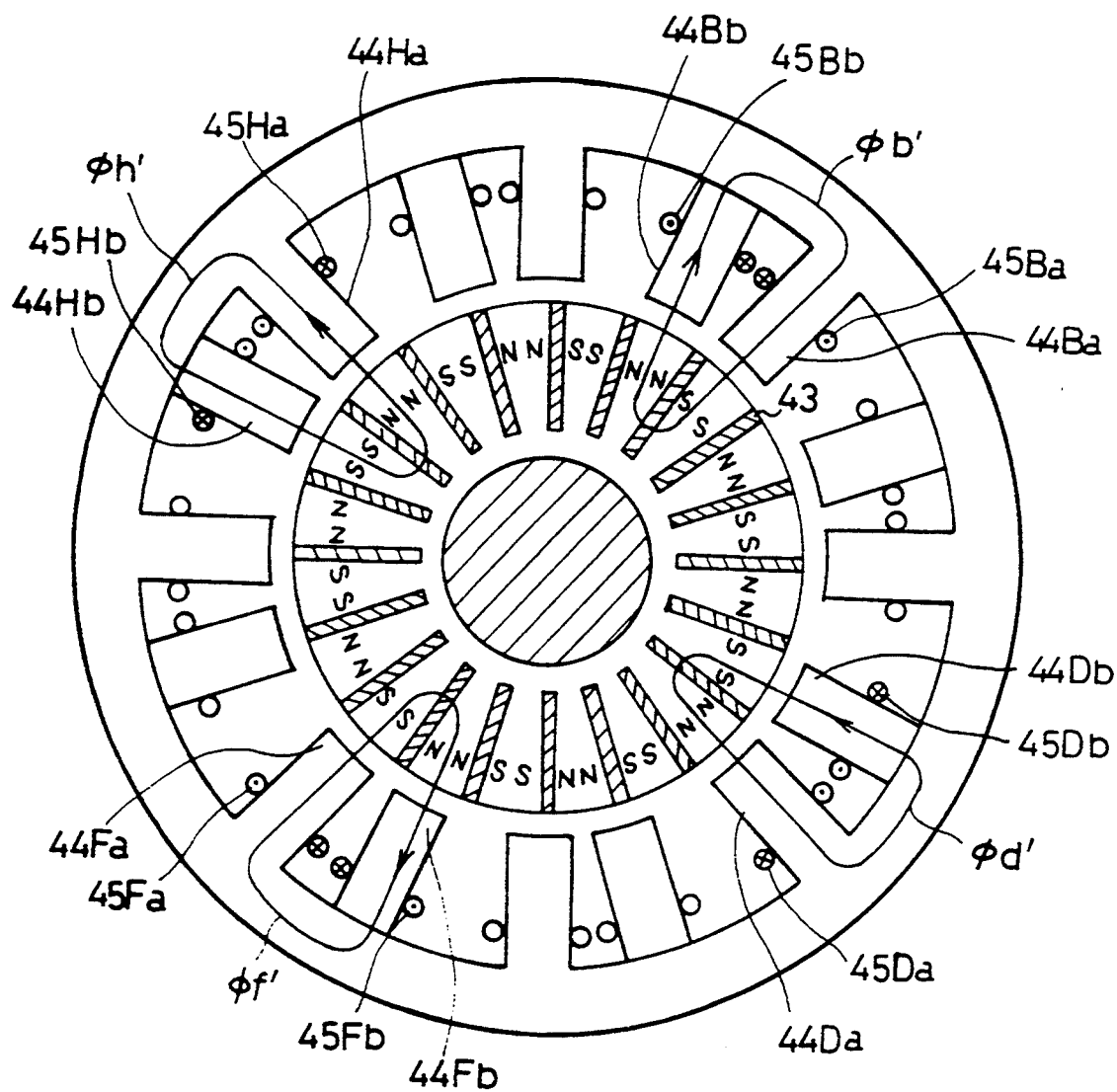
FIG. 14 is a schematic front view of the rotary pulse motor of FIG. 7 for explaining the operations thereof, in which the other group of the coils is energized in the other current direction.

(4) As shown in FIG. 14, a predetermined current is supplied to the paired coils 45Ba and 45Bb, 45Da and 45Db, 45Fa and 45Fb, and 45Ha and 45Hb, in the direction shown by the marks (x ) and (.), through the terminals Tc and Td. Main magnetic flux loops $\phi b'$, $\phi d'$, $\phi f'$, and $\phi h'$ are formed between the stator 40 and the rotor 41, as shown in FIG. 14. In the magnetic flux loop $\phi b'$, the magnetic flux flows through the path as the magnetic-pole 44Ba of the iron core 44→air gap G→the S-polarized teeth 42a of the rotor 41→the permanent magnet 43→the N-polarized teeth 42a of the rotor 41 adjacent to the same S-polarized teeth 42a→an axial path as shown in FIG. 15→air gap→the magnetic pole 4Bb→an axial path as shown in FIG. 15→the magnetic pole 44Ba. The other magnetic flux loops $\phi d'$, $\phi f'$ and $\phi h'$ are formed in the similar manner. As the result, the rotor 41 takes such a magnetically stable position that the end surfaces of the magnetic-poles 44Ba, 44Db, 44Fa and 44Hb are directly facing to the end surfaces of the S-polarized teeth 42a of the rotor 410 and the end surfaces of the magnetic poles 44Bb, 44Da, 44Fb and 44Ha are directly facing to the end surfaces of the N-polarized teeth 42a of the corot 41.

The coils are, in turn, energized by the pulse currents in the manners as described in the above sequence (1)→(2)→(3)→(4). The rotor 41 is rotated in the clockwise direction, in the drawings. When the coils are energized in the order of (4)→(3)→(2)→(1), the rotor 41 is rotated in the anti-clockwise direction.

Figure 16:
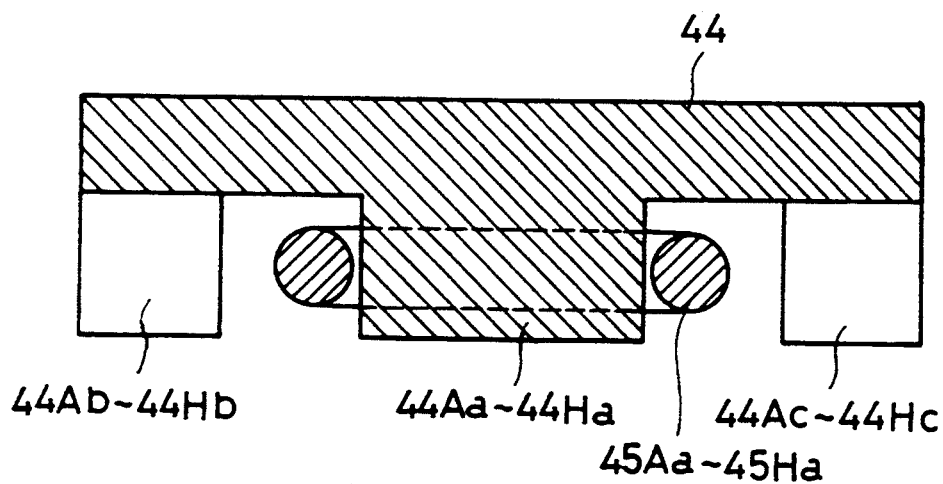
FIG. 16 is an enlarged cross-sectional view of an important part of a rotary pulse motor according to a second embodiment of this invention.

Next, there will be described a second embodiment of this invention with reference to FIG. 16.

the first embodiment, the two rows of the magnetic-poles 44Aa to 44Ha and 44Ab to 44Hb are formed at the phase difference of 180 degrees from each other, in the stator 40.

In the second embodiment, two rows of magnetic-poles 44Ab to 44Hb and 44Ac to 44Hc are formed at both sides of the central row of magnetic-poles 44Aa to 44Ha, and they are shifted at the phase of 180 degrees from the central row. Coils 45Aa to 45Ha are wound only on the central magnetic-poles 44Aa to 44Ha, and they are energized in the above described manner. The rotor 41 is rotated in the clockwise direction or anti-clockwise direction.

Figure 17:
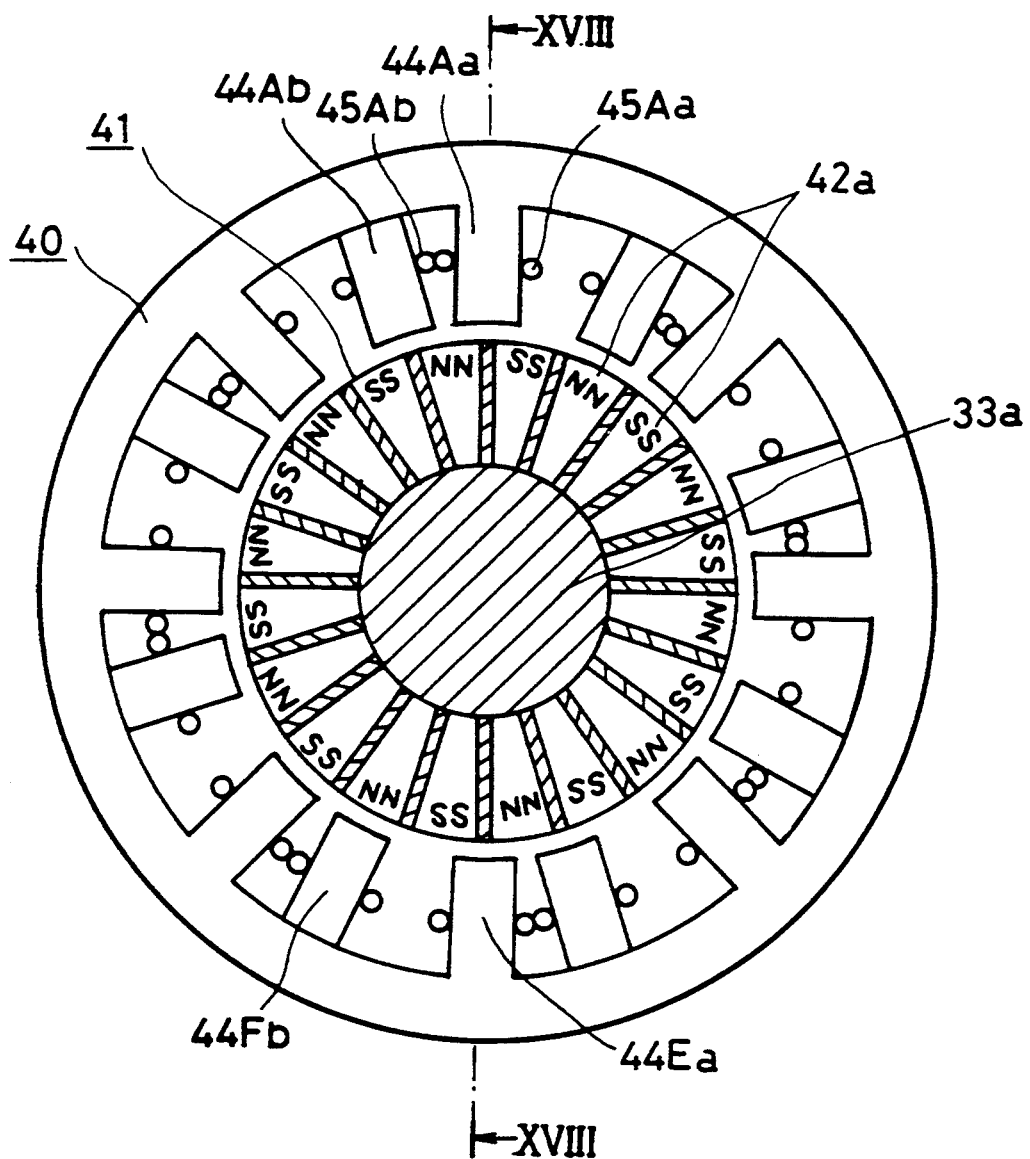
FIG. 17 is a schematic front view of a rotary pulse motor according to a third embodiment of this invention.
Figure 18:
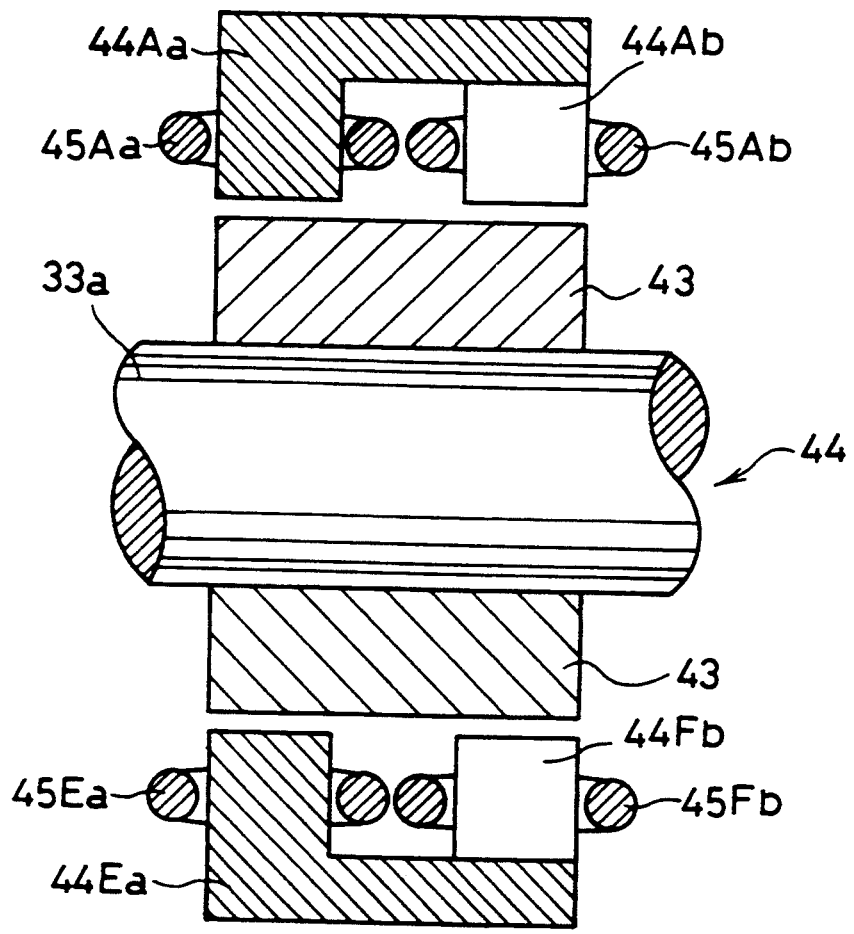
FIG. 18 is an enlarged cross-sectional view taken along the line XVIII—XVIII in FIG. 17.

Next, a third embodiment of this invention will be described with reference to FIG. 17 and FIG. 18. Parts in FIG. 17 and FIG. 18 which correspond to those in FIG. 7, are denoted by the same reference numerals, and the description thereof also corresponds.

In this embodiment, a shaft 33a fixed to the central hole of the rotor 41 is made of non-magnetic material, rather than magnetic-material. In the above embodiments, the flux from the N-polarity Of the one permanent magnet 43 flows directly to the S-polarity thereof (short-circuited), when not energized. In this embodiment, the permanent magnets 43 contact with the shaft 33a made of non-magnetic material. Accordingly, the inner ends of the adjacent teeth 42a are intercepted magnetically from each other.

When no current is supplied to the coil 45Aa to 45Ha and 45Ab to 45Hb, all magnetic fluxes from the permanent magnets 43 flow through the path as the N-polarized teeth 42a of the rotor 41→air gap G→the magnetic-poles 44Aa to 44Ha→the axial paths $d_1$ and $d_2$→the magnetic-poles 44Ab to 44Hb→air gap G→the S-polarized teeth 42a of the rotor 41. Accordingly, the rotor 41 is forcibly stopped at the shown position by the magnetic force. When the coils are energized, the rotor 41 is rotated by the same operation principle as described for the above embodiments.

FIG. 19A and 19B show a fourth embodiment of this invention. A cylindrical rotor 51 made of magnetic material is inserted into a cylindrical stator 50 made of magnetic material. The rotor 51 is supported at its center by a shaft 46 made of magnetic-material. The shaft 46 is rotatably supported by not-shown bearings. Teeth 52a, 52a —and slit-like grooves 52b, 52b—are alternately formed in a peripheral portion of the rotor 51. Permanent magnets 52 are so inserted into the slit-like grooves 52b, 52b—that the teeth 52a, 52a, —are magnetized alternately in opposite polarities.

The stator 50 include a first iron core 54 and a second iron core 56. Two rows of magnetic poles 54Aa to 54Ja, and magnetic poles 54Ab to 54Jb are formed at angular regular pitches in an inner peripheral portion of the first iron core 54. Similarly, two rows of magnetic-poles 56Aa to 56Ja, and magnetic poles 56Ab to 56Jb are formed at angular regular pitches in an inner peripheral portion of the second iron core 56 as best shown in FIG.

Figure 20:
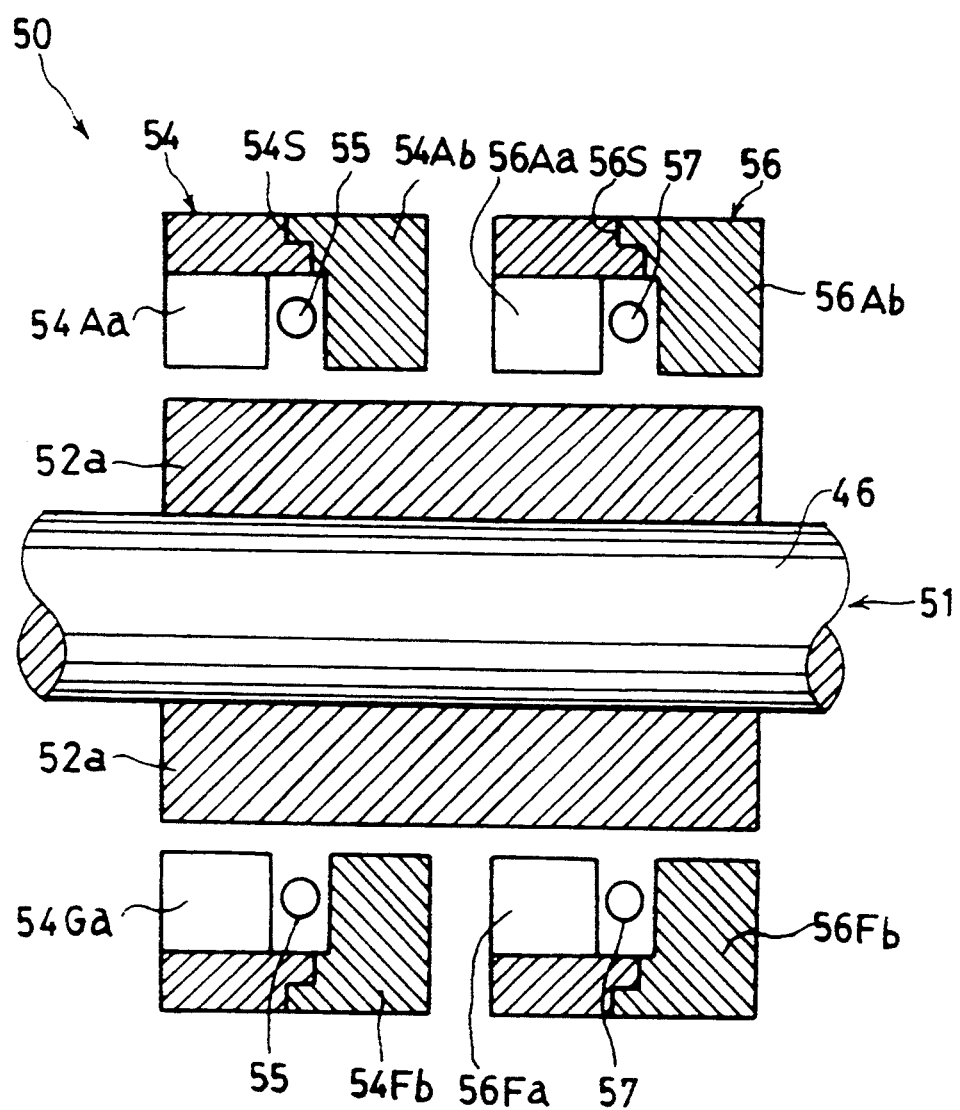
FIG. 20 is a cross-sectional view of the rotary pulse motor of FIG. 19A, taken along the line XX—XX.

19B. The first iron core 54 and the second iron core 56 each consist of two pieces, respectively. Annular coils 55 and 57 are inserted in annular grooves between the two pieces as shown in FIG. 20. The two pieces are fitted to each other at contact surfaces 54S, and 56S, respectively. Since the first and second cores 54 and 56 consist of the two pieces, respectively, the coils 55 and 57 can be easily mounted on the first and second cores 54 and 56. The stator 50 consists of the first and second cores 54 and 56, the coils 55 and 57.

The pitch between the teeth 52a magnetized in the same polarity is equal to P. The magnetic poles 54Aa to 54Ja and 54Ab to 54Jb are formed at the constant pitch P, in the core 54. The one row of the magnetic poles 54Aa to 54Ja is shifted of the pitch of P/2 from the other row of the magnetic-poles 54Ab to 54Jb.

Similarly, the magnetic-poles 56Aa to 56Ja and 56Ab to 56Jb are formed at the constant pitch P in the other core 56. The one row of the magnetic-poles 56Aa to 56Ja is shifted at the pitch of P/2 from the other row of the magnetic poles 56Ab to 56Jb. The magnetic poles of the first core 54 are shifted by the pitch of P/4 from those of the second core 56. The Ditch P corresponds to the phase difference of 360 degrees. Accordingly, the pitches P/2 and P/4 correspond to the 180 degrees and 90 degrees, respectively.

When no current is supplied to the coils 55 and 57, the polarities of the permanent magnets 52 are short-circuited in the inner-most portion of the rotor 51.

Next, there will be described operations of the rotary pulse motor of FIG. 19A, with reference to FIG. 21 to FIG. 28.

The coils 55 and 57 are energized in the one-phase excitation method in which they are alternately energized.

Figure 21:
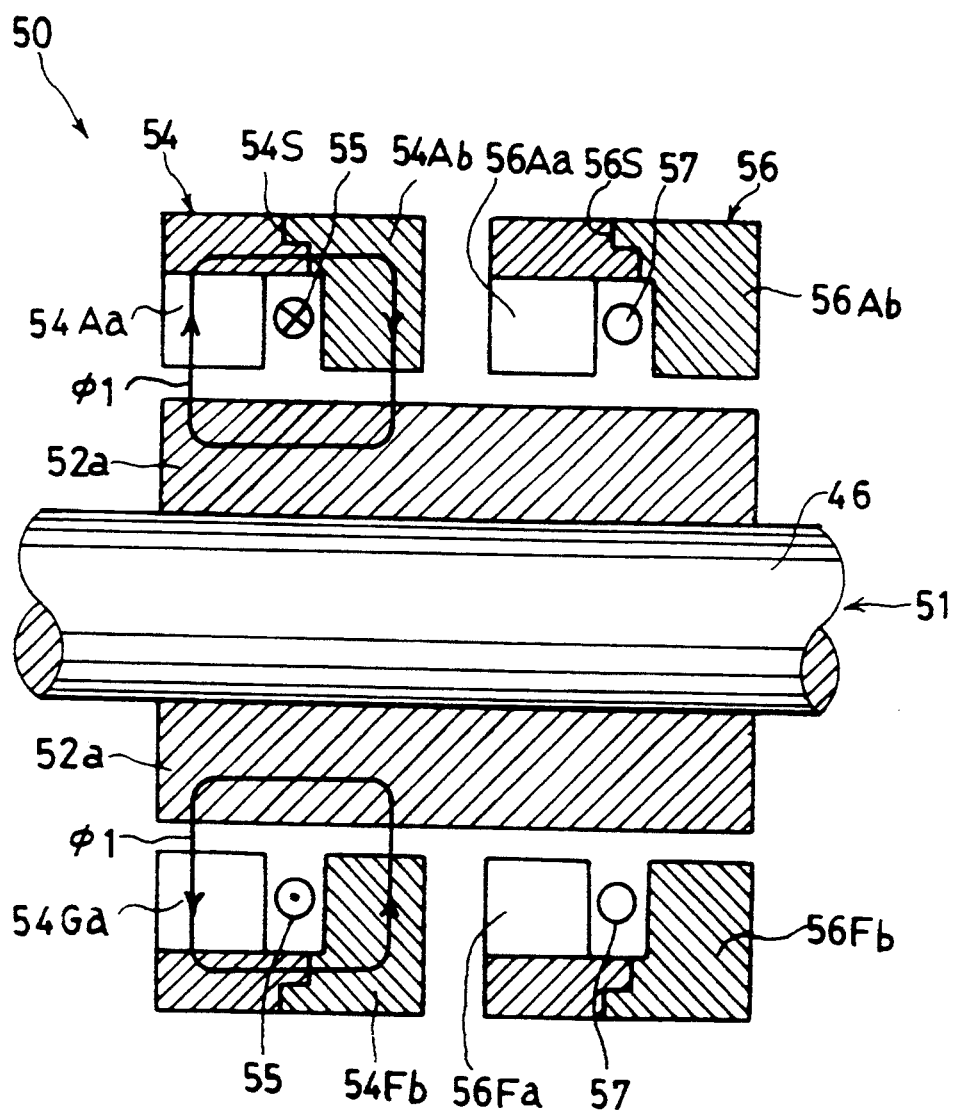
FIG. 21 is a cross-sectional view similar to FIG. 20, in which a pulse current in one direction is supplied to the one coil :for explaining the operation thereof.

(1) As shown in FIG. 21, a predetermined current is supplied to the coil 55, in the direction shown by the marks (x) and (.). A main magnetic flux loop $\phi_1$ is formed along the path as the magnetic-pole 54Ab of the first iron core 54→air gap G→the S-polarized teeth 52a of the rotor 51→the adjacent N-polarized teeth 52a of the rotor 51→the axial path→air gap G→the magnetic-pole 54Aa of the first iron core 54. Similarly, other main magnetic flux loops are formed with respect to the other magnetic poles 54Ba to 54Ja and 54Bb to 54Jb, too.

Figure 22:
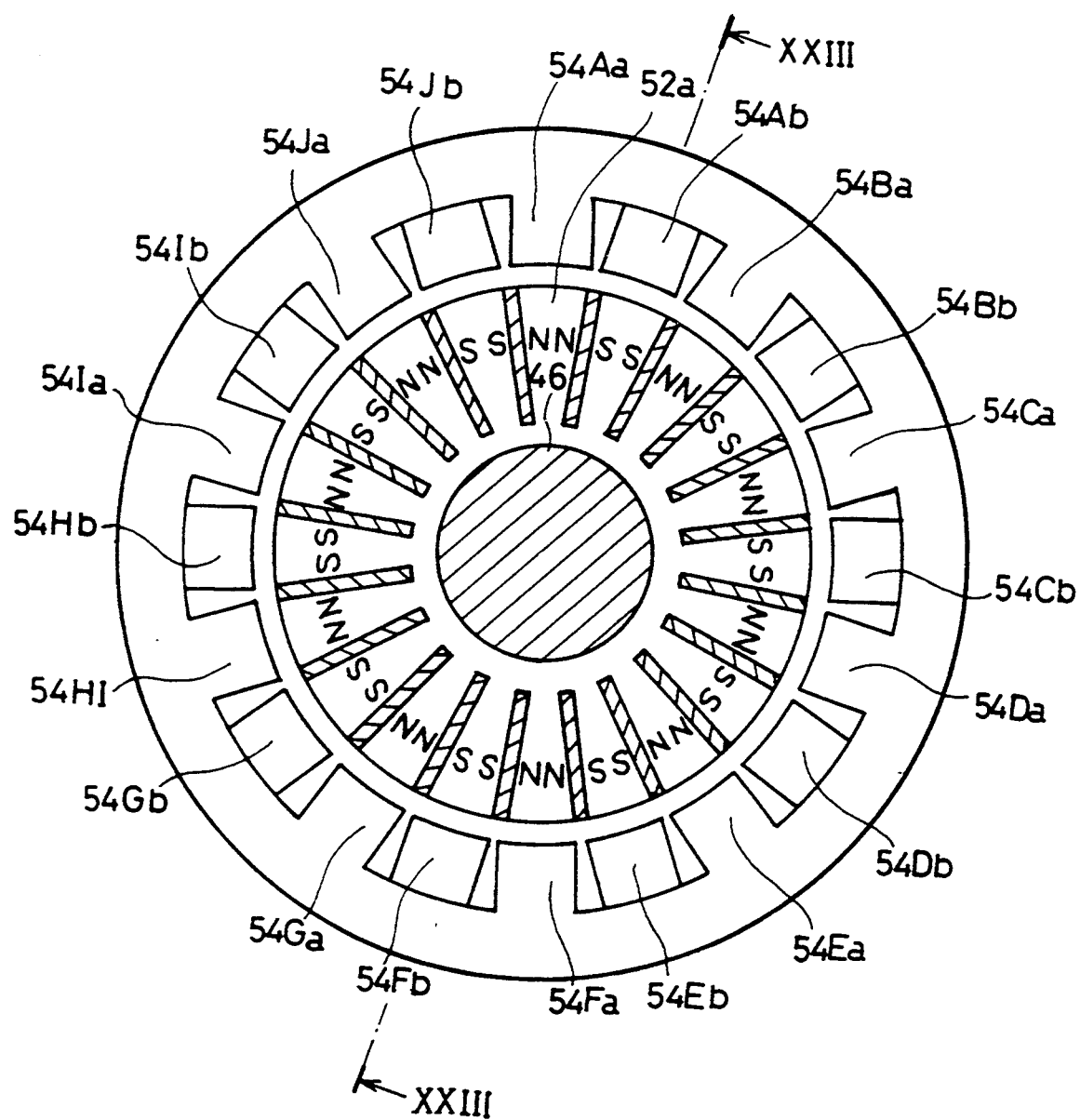
FIG. 22 is a schematic front view similar to FIG. 19A, for explaining the operation thereof.

As the result, the rotor 51 takes such a magnetically stable position that the end surfaces of the magnetic poles 54Aa to 54Ja of the first iron core 54 are facing to the N-polarized teeth 52a of the rotor 51, and the end surfaces of the magnetic-poles 54Ab to 54Jb are facing to the S-polarized teeth 52a of the rotor 51, as shown in FIG. 22.

Figure 23:
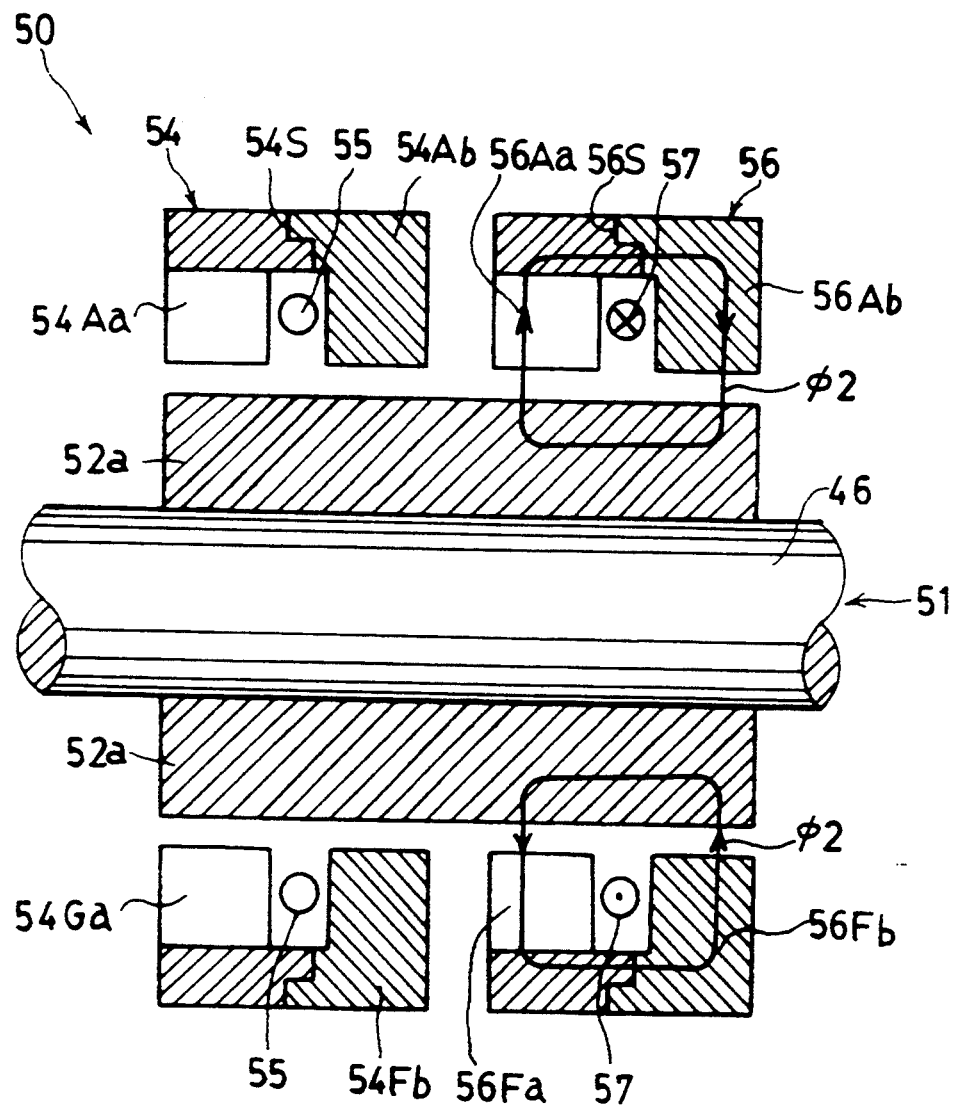
FIG. 23 is an enlarged cross-sectional view similar to FIG. 20, in which a pulse current in one direction is supplied to the other coil, for explaining tile operation thereof.
Figure 24:
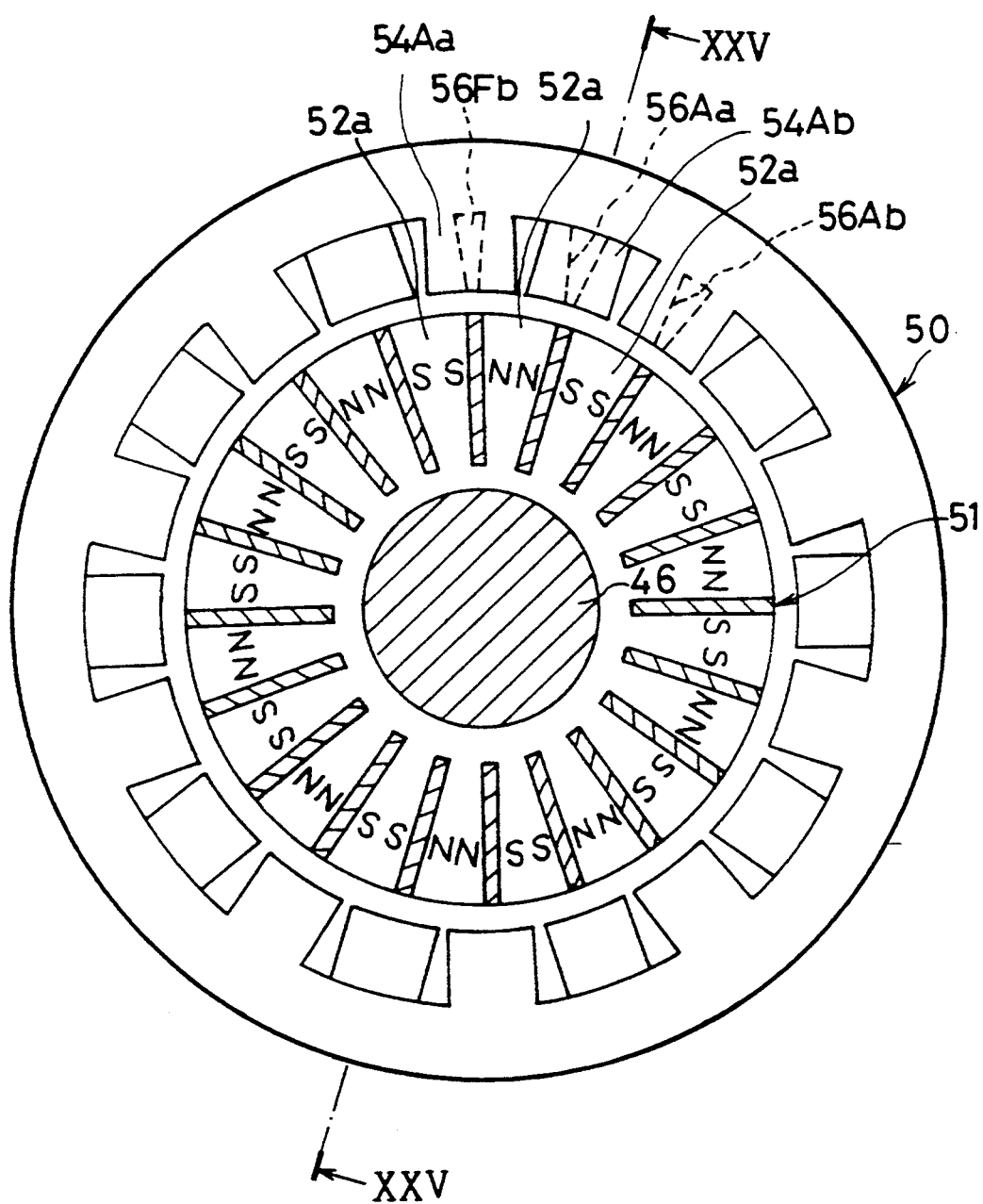
FIG. 24 is a schematic front view similar to FIG. 19A, for explaining the operation thereof.

(2) As shown in FIG. 23, a predetermined current is supplied to the coil 57, in the direction shown by the marks (x) and (.). A main magnetic flux loop $\phi_2$ is formed along the path of the magnetic-pole 56Ab of the second iron core 56→air gap→the S-polarized teeth 52a of the rotor 51→the adjacent N-polarized teeth 52a of the rotor 51→the magnetic-pole 56Aa of the second iron core 56. Similarly, main magnetic flux loops are formed with respect to the other magnetic poles 56Ba to 56Ja and 56Bb to 56Jb, As the result, the rotor 51 takes such a magnetically stable position that the end surfaces of the magnetic poles 56Aa to 56Ja of the second iron core 56 are facing to the N-polarized teeth 52a of the rotor 51, and the end surfaces of the magnetic-poles 56Ab to 56Jb are facing to the S-polarized teeth 52a of the rotor 51, as shown in FIG. 24.

Figure 25:
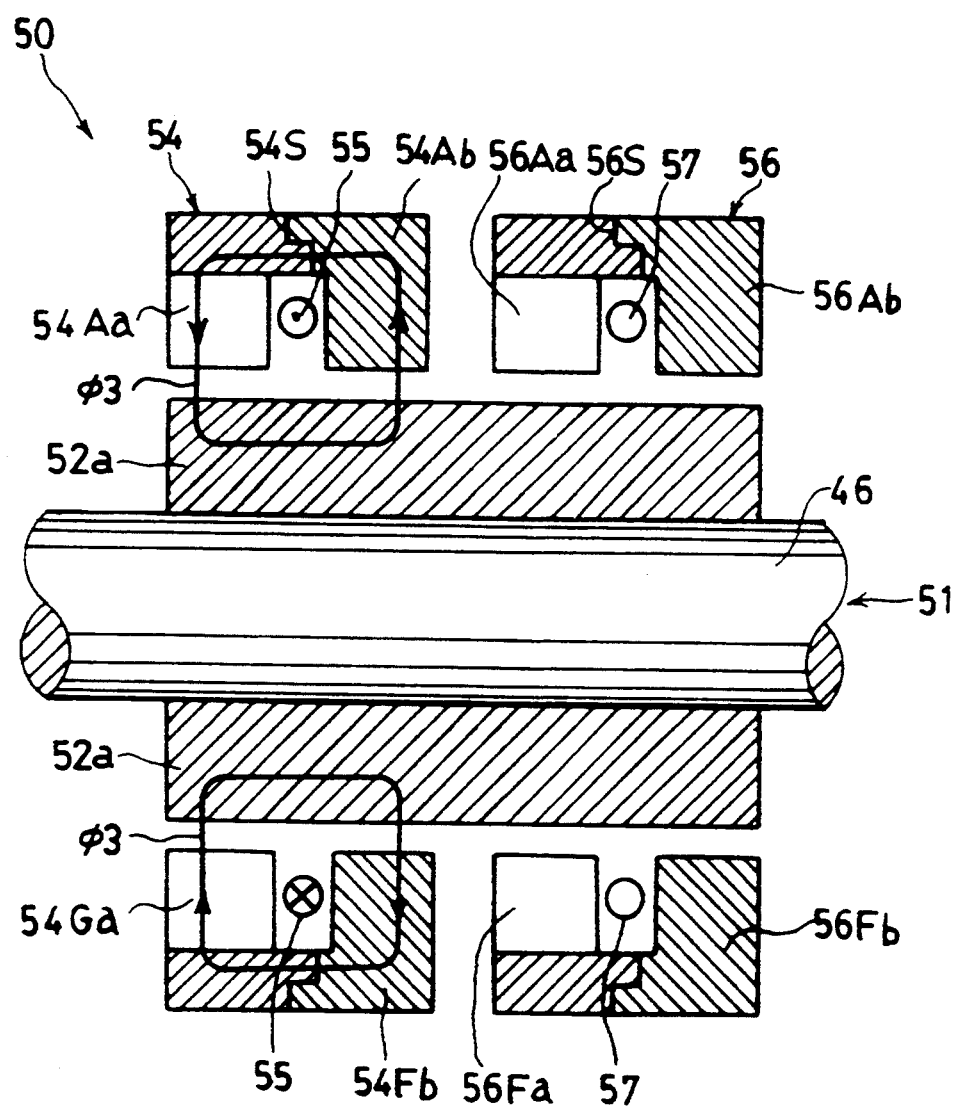
FIG. 25 is an enlarged cross-sectional view similar to FIG. 20, in which a pulse current in the other direction is supplied to the one coil, for explaining the operation thereof.
Figure 26:
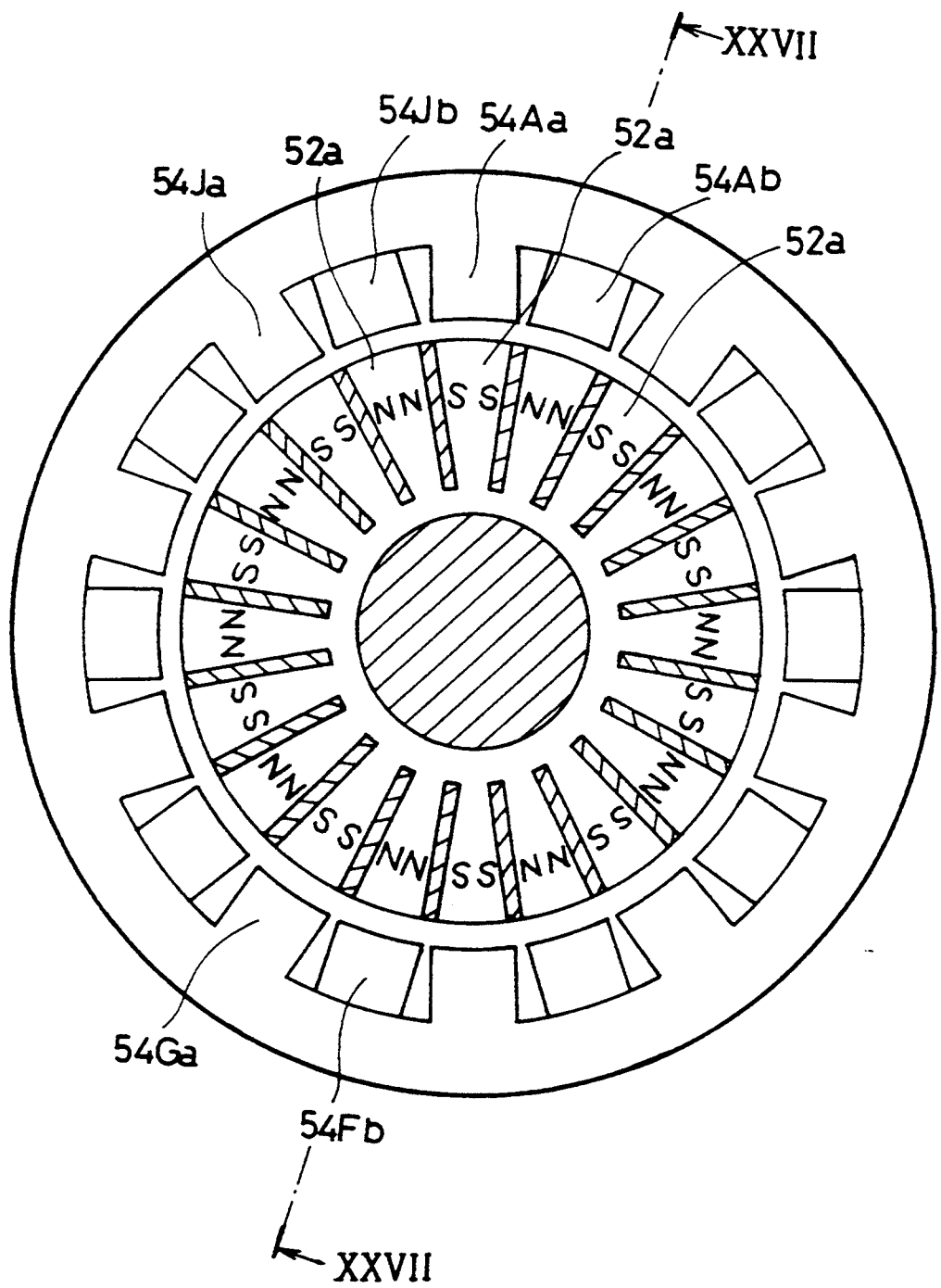
FIG. 26 is a schematic front view similar to FIG. 19A, for explaining the operation thereof.

(3) As shown in FIG. 25, a predetermined current is supplied to the coil 55, in the direction shown by the marks (x) and (.). A main magnetic flux loop $\phi_3$ is formed along the path of the magnetic-pole 54Aa of the first iron core 54→air gap G→the S-polarized teeth 52a of the rotor 51→the adjacent N-polarized teeth 52a of the rotor 51→the axial path→the magnetic-pole 54Ab of the first iron core 54. The direction of $\phi_3$ is opposite to that of $\phi_1$. Similarly, other magnetic flux loops are formed with respect to the other magnetic poles 54Ba to 54Ja and 54Bb to 54Jb, too. As the result, the rotor 51 takes such a magnetically stable position that the end surfaces of the magnetic poles 54Aa to 54Ja of the first iron core 54 are facing to the S-polarized teeth 52a of the rotor 51, and the end surfaces of the magnetic-poles 54Ab to 54Jb are facing to the N-polarized teeth 52a of the rotor 51, as shown in FIG. 26.

Figure 27:
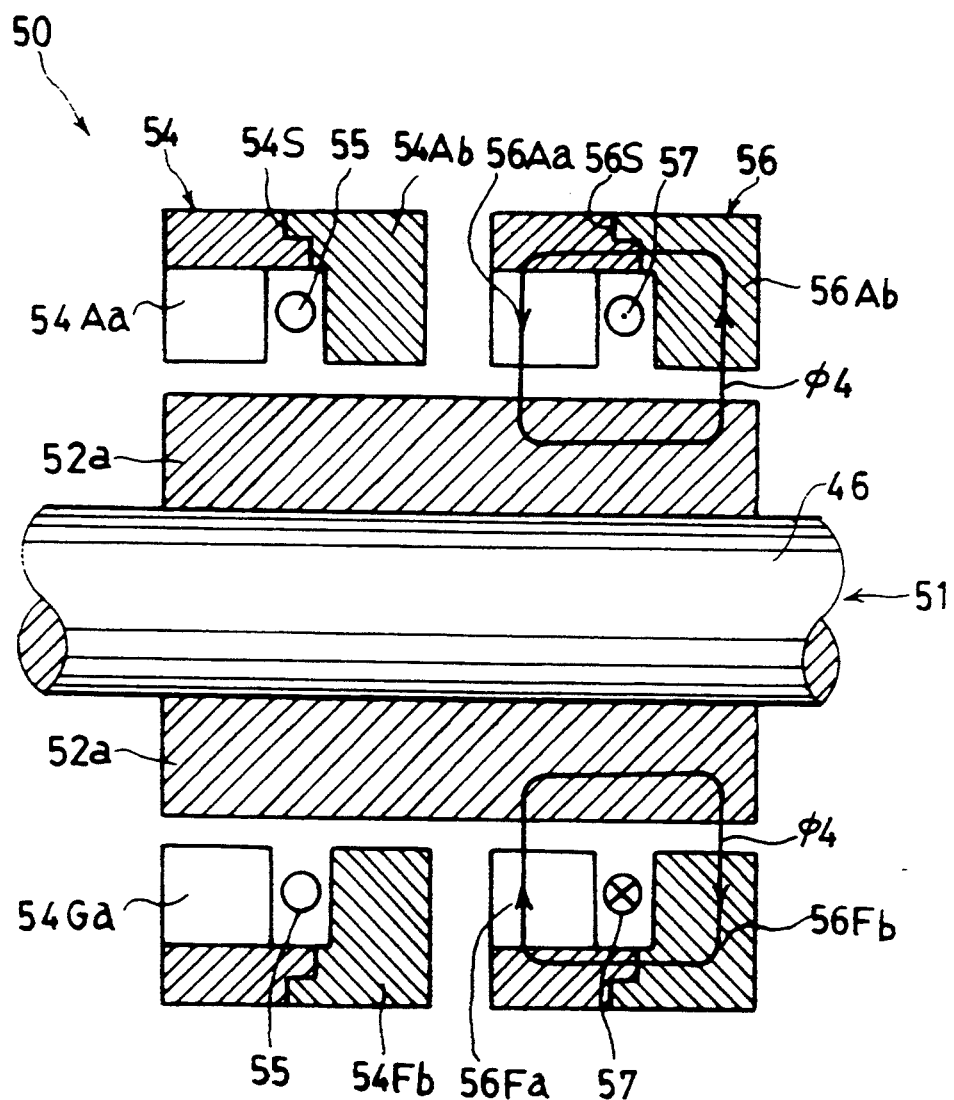
FIG. 27 is an enlarged cross-sectional view similar to FIG. 20, in which a pulse current in another direction is supplied to the other coil, for explaining the operation thereof.

(4) As shown in FIG. 27, a predetermined current is supplied to the coil 57, in the direction shown by the marks (x) and (.). A main magnetic flux loop $\phi_4$ is formed along the path as .the magnetic-pole 56Aa of the second iron core 56→air gap G→the S-polarized teeth 52a of the rotor 51→the adjacent N-polarized teeth 52a of the rotor 51→the axial path→air gap→ the magnetic-pole 56Ab of the second iron core Similarly, main magnetic flux loops are formed with respect to the other magnetic poles 56Ba to 56Ja and 54Bb to 56Jb, too.

Figure 28:
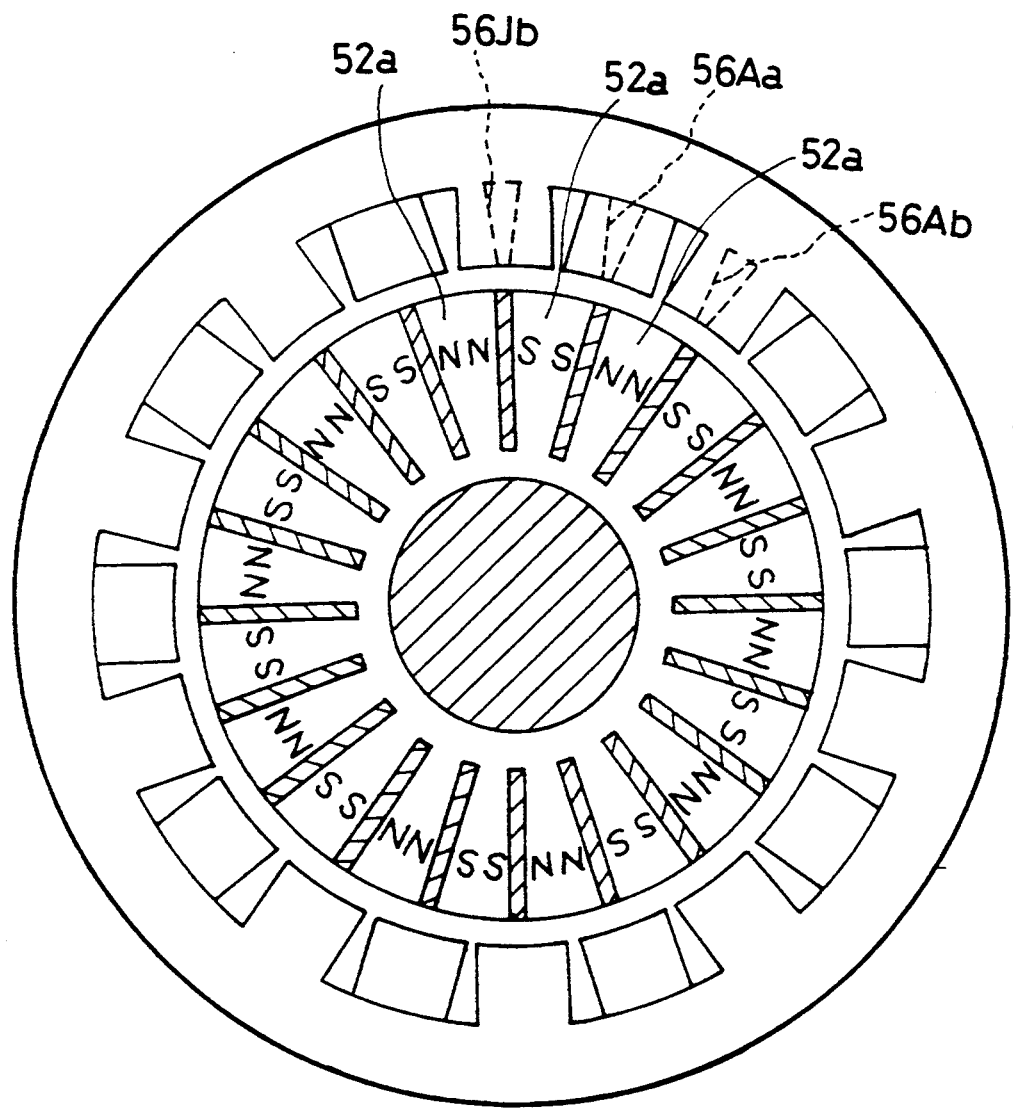
FIG. 28 is a schematic front view similar to FIG. 19A, for explaining the operation thereof.

As the result, the rotor 51 takes such a magnetically stable position that the end surfaces of the magnetic poles 56Aa to 56Ja of the second iron core 56 are facing to the S-polarized teeth 52a of the rotor 51, and the end surfaces of the magnetic-poles 56Ab to 56Jb are facing to the N-polarized teeth 52a of the rotor 51, as shown in FIG. 28.

The pulse excitation is repeated in the above described order of (1)→(2)→(3)→(4). The rotor 51 is rotated in the clockwise direction. When the pulse excitation is repeated in the order of (4)→(3)→(2)→(1), the rotor 51 is rotated in the anti-clockwise direction.

Figure 19:
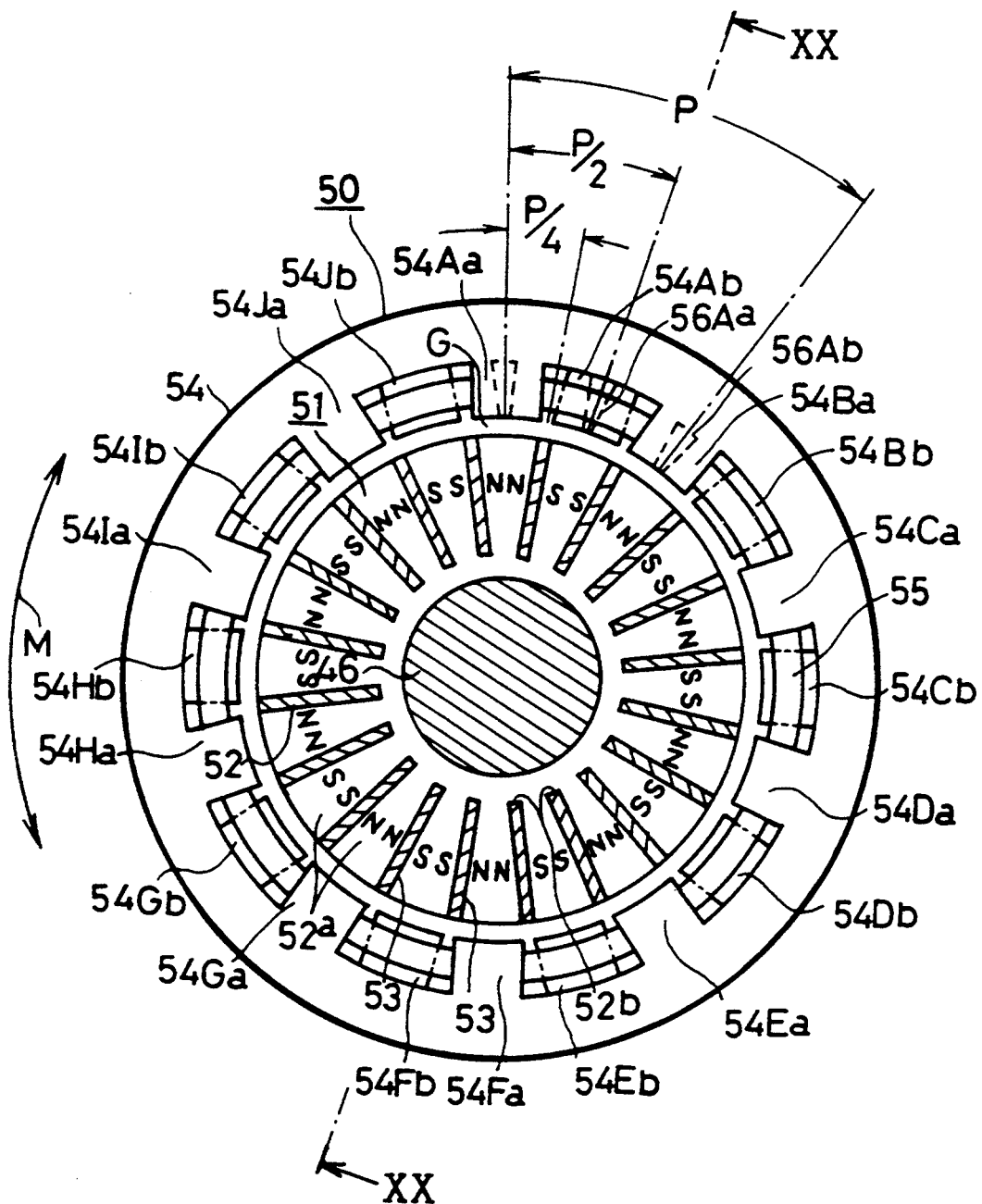
FIG. 19A is a schematic front view of a rotary pulse motor according to a fourth embodiment of this invention.
FIG. 19B is a schematic front view of a rear part of the rotary pulse motor of FIG. 19A.
Figure 19:
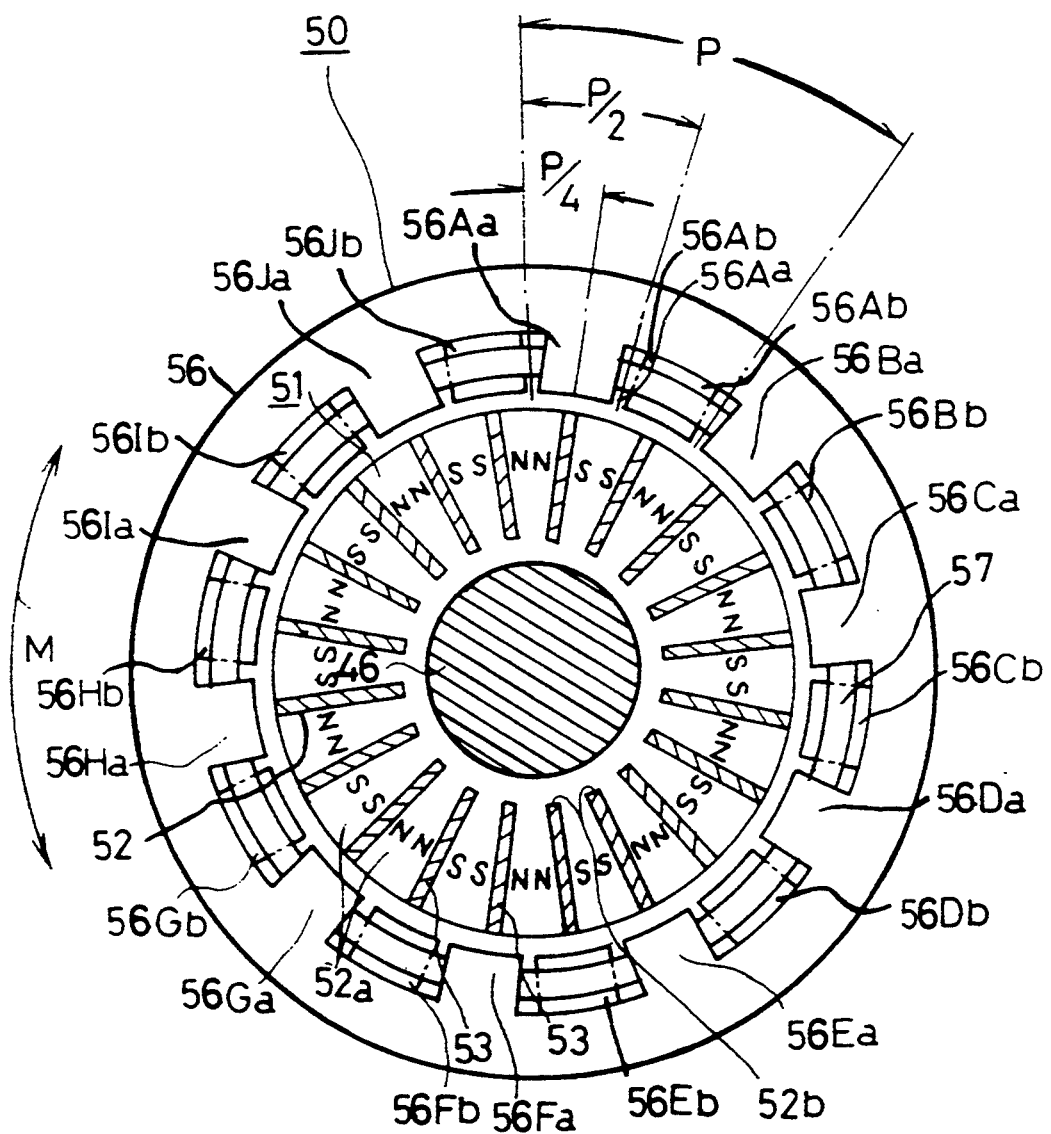
Figure 29:
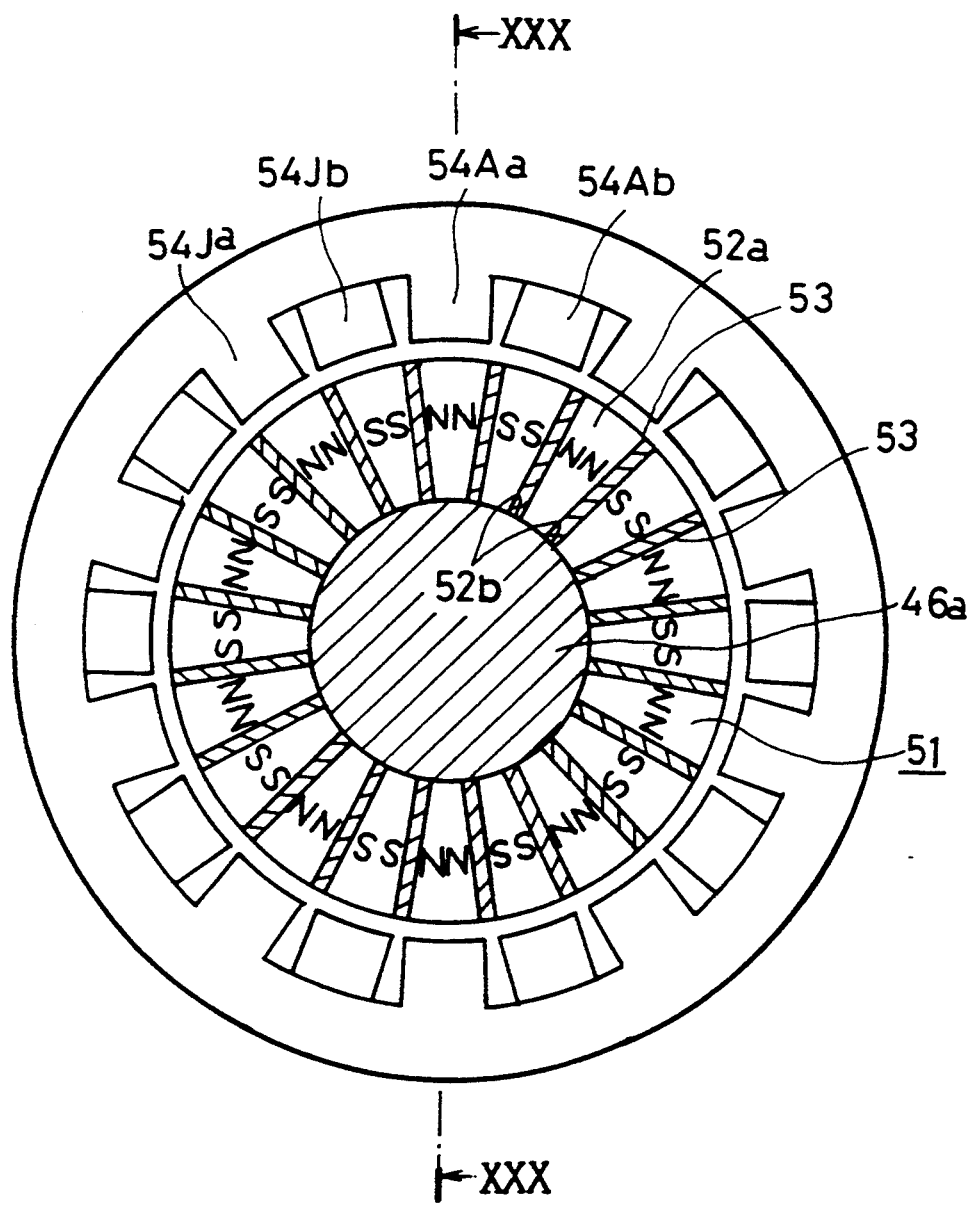
FIG. 29 is a schematic view of a rotary pulse motor according to a fifth embodiment of this invention.

Next, a fifth embodiment of this invention will be described with reference to FIG. 29 and FIG. 30. Parts in FIG. 29 and FIG. 30 which correspond to those in FIG. 19 and FIG. 20, are denoted by the same reference numerals, and the description thereof also corresponds.

In this embodiment, a shaft 46a fixed to the central hole of the rotor 51 is made of non-magnetic material, not magnetic-material. In the above fourth embodiment, the opposite polarities of the permanent magnets 53 are short-circuited. In this embodiment, the permanent magnets 53 contact with the shaft 46a made of non-magnetic material. Accordingly, the adjacent teeth 52a are intercepted magnetically from each other.

When no current is supplied to the coils 55 and 57, all magnetic fluxes from the permanent magnets 53 flow through the path as the N-polarized teeth 52a of the rotor 51→air gap→the magnetic-poles 54Aa to 54Ha and 56Aa to 56Ha→the axial paths→the magnetic-poles 54Ab to 54Hb and 56Ab to 56Hb air gap→the S-polarized teeth 52a of the rotor 56. Accordingly, the rotor 51 is forcibly stopped at the shown position by the magnetic force. When the coils are energized, the rotor 51 is rotated by the same operation principle as set forth for the above fourth embodiment.

Figure 31:
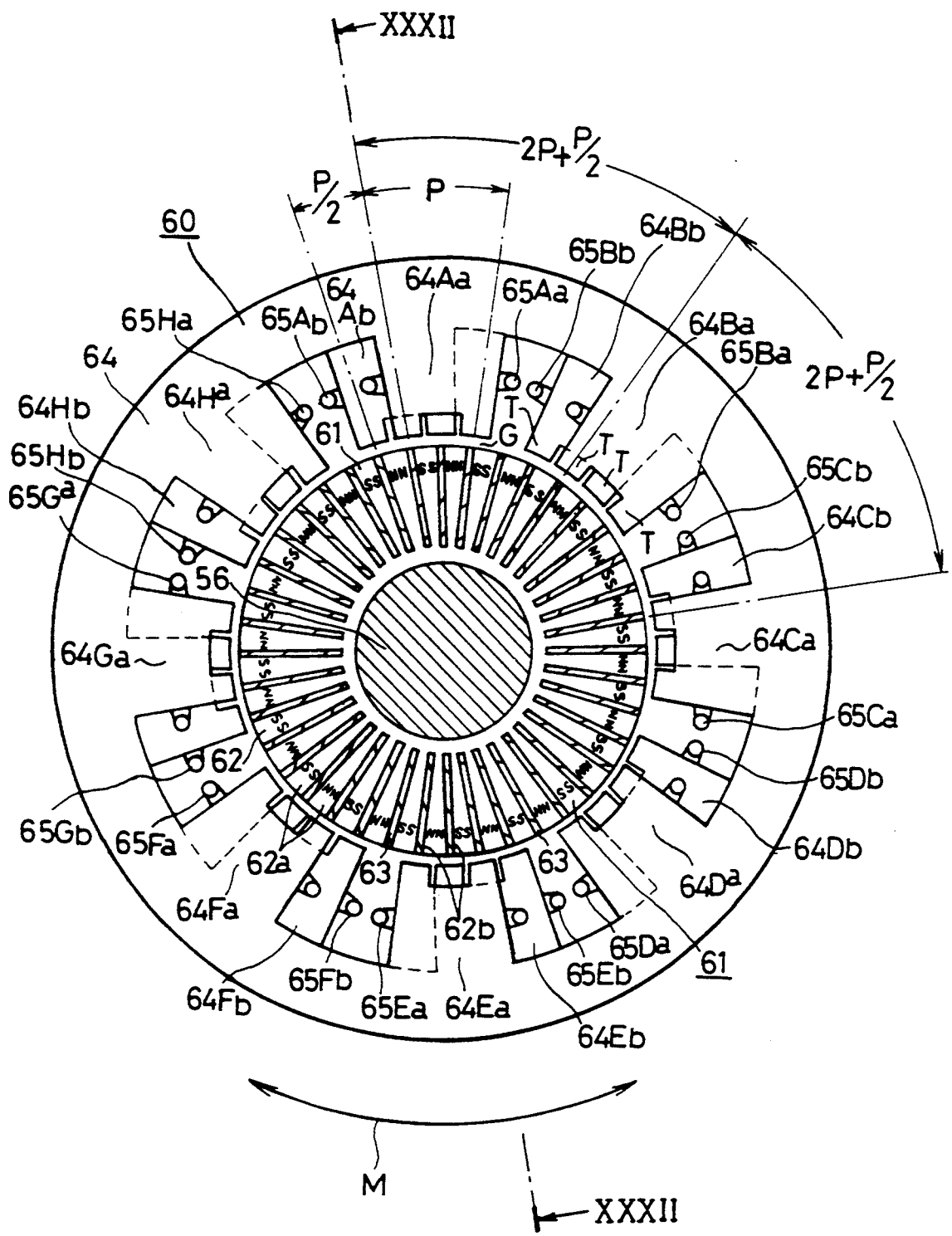
FIG. 31 is a schematic front view of a rotary pulse motor according to a sixth embodiment of this invention.

FIG. 31 shows a sixth embodiment of this invention. A cylindrical rotor 61 made of magnetic material is inserted into a cylindrical stator 60 made of magnetic material. The rotor 61 is supported at its center by a shaft 56 made of magnetic material fixed to a central hole of the rotor 61, and it is rotatably supported by not-shown bearings. The rotor 61 can be rotated in the directions shown by an arrow M. Teeth 62a, 62a—and slit-like grooves 62b, 62b—are formed alternately at an angular regular pitch P/2 in a peripheral portion of the rotor 61. Permanent magnets 63 are inserted into the slit-like grooves 62b, 62b—so that the teeth 62a, 62a—are magnetized alternately in opposite polarity.

Figure 32:
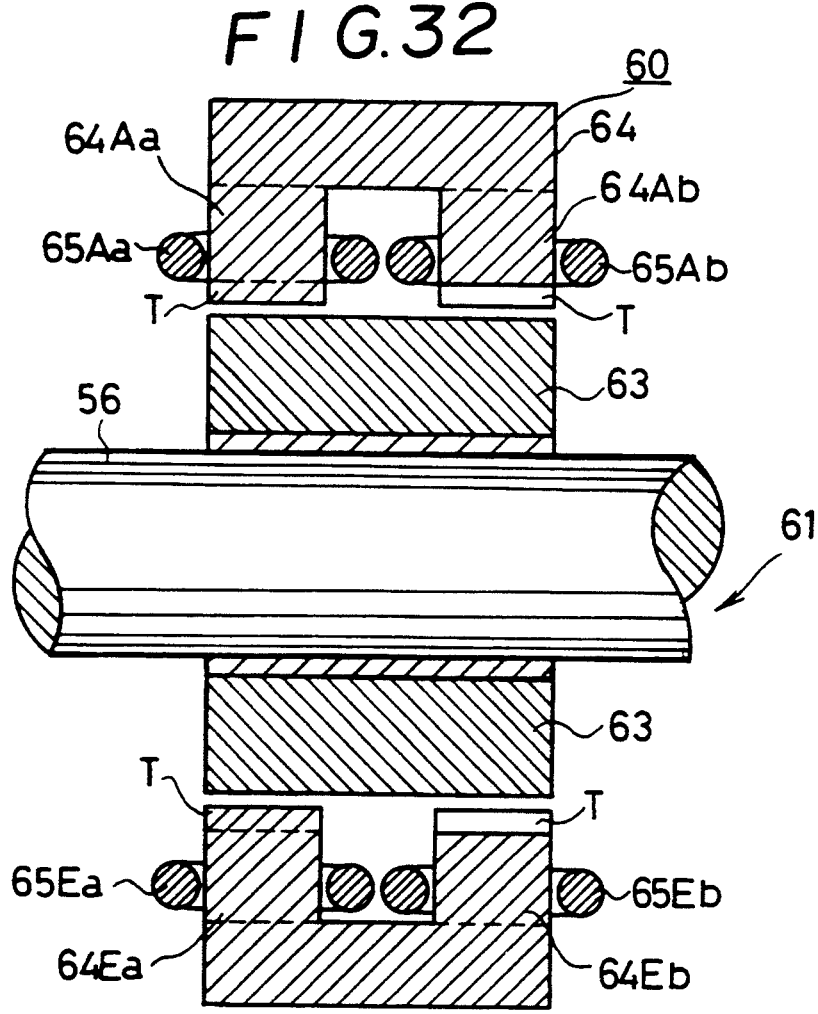
FIG. 32 is a cross-sectional view taken along the line XXXII—XXXII in FIG. 31.

A first row of magnetic poles 64Aa, 64Ba, 64Ca, 64Da, 64Ea, 64Fa, 64Ga and 64Ha and a second row of magnetic poles 64Ab, 64Bb, 64Cb, 64Db, 64Eb, 64Fb, 64Gb and 64Hb are formed in an inner periphery of an iron core 64 constituting the stator 60. Coils 65Aa, 65Ba, 65Ca, 65Da, 65Ea, 65Fa, 65Ga and 65Ha are wound on the magnetic poles 64Aa, 64Ba, 64Ca, 64Da, 64Ea, 64Fa, 64Ga and 64Ha, respectively, while coils 65Ab, 65Bb, 65Cb, 65Db, 65Eb, 65Gb and 65Hb are wound on the magnetic poles 64Ab, 64Bb, 64Cb, 64Db, 64Eb, 64Fb, 64Gb and 64Hb, respectively. The stator 60 consists of the iron core 64 and the coils 65Aa to 65Ha, 65Ab to 65Hb. The magnetic poles 64Aa to 64Ha, 64Ab to 64Hb are facing to the rotor 61 at a constant air gap G. The pitch of the teeth 62a magnetized in the same polarity is equal to P. Accordingly, the magnetic poles 64Ba, 64Ca, 64Da, 64Ea, 64Fa, 64Ga and 64Ha are arranged at the phase differences P/2 with respect to the magnetic pole 64Aa. Thus, the phase difference between the adjacent magnetic poles 64Aa and 64Ba, 64Ba and 64Ca, and so forth, is 180 degrees. Similarly, the phase difference between the adjacent magnetic poles 64Ab and Bb, 64Bb and 64Cb, and so forth, is 180 degrees in the second row. The first row of the magnetic poles 64Aa to 64Ha is shifted by a predetermined length from the second row of the magnetic-poles Ab to 64Hb in the axial direction, as shown in FIG. 32, and the phase difference between the former and the latter is equal to P/2.

The coil 65Aa and 65Ab are wound in such a direction that magnetic fluxes in opposite directions are generated in the magnetic poles 64Aa and 64Ab, respectively. Similarly coils Ba and 65Bb, 65Ca and 65Cb and so forth to 65Ha and Hb are wound in such a direction that magnetic fluxes in opposite directions are generated in the magnetic poles 64Ba and 64Bb, 64Ha and 64Hb, respectively.

Magnetic teeth T, T are formed in the top ends of the magnetic poles 64Aa to 64Ha and 64Ab to 64Hb. The width of the magnetic teeth T is substantially equal to that of the teeth 62a.

When no current is supplied to all of the coils 65Aa to 65Ha and 65Ab to 65Hb, the magnetic circuits are short-circuited by the inner-most magnetic-loops formed between the N-polarity of the permanent magnets 63 and the S-polarity thereof.

The coils 65Aa to 65Ha and 65Ab to 65Hb are connected in the manner shown in FIG. 9. Not-shown terminals for A-phase are connected to the paired magnetic poles 65Aa and 65Ab, 65Ca and 65Cb, 65Ea and 65Eb and 65Ga and 65Gb. Not-shown terminals for B-phase are connected to the paired magnetic poles 65Ba and 65Bb, 65Da and 65Db, 65Fa and 65Fb and 65Ha and 65Hb.

A current is supplied alternately through the terminals for A-phase and B-phase. Thus, the rotary pulse motor is driven in one-phase excitation method.

(1) A predetermined current is supplied to the paired coils 65Aa and 65Ab, 65Ca and 65Cb, 65Ea and 65Eb, and 65Ga and 65Gb.

Main magnetic flux loops $\phi$ are formed between the stator 60 and the rotor 61. The magnetic flux flows through the path as the magnetic-pole 64Ab of the iron core 64→air gap→the S-polarized teeth 62a of the rotor 61→the permanent magnet 63→the N-polarized teeth 62a of the rotor 61 adjacent to the sameS-polarized teeth 62a→axial path→air gap→the magnetic pole 64Aa→another axial path as shown by d in FIG. 34→the magnetic pole 64Ab. The other magnetic flux loops are formed in the similar manner. As the result, the rotor 61 takes such a magnetically stable position that the end surfaces of the magnetic teeth T of the magnetic-poles 64Aa, 64Cb, 64Ea and 64Gb are directly facing to the end surfaces of the N-polarized teeth 62a of the rotor 61, and the end surfaces of the magnetic teeth T of the magnetic poles 64Ab, 64Ca, 64Eb and 64Ga are directly facing to the end surfaces of the S-polarized teeth 62a of the rotor 61.

Figure 34:
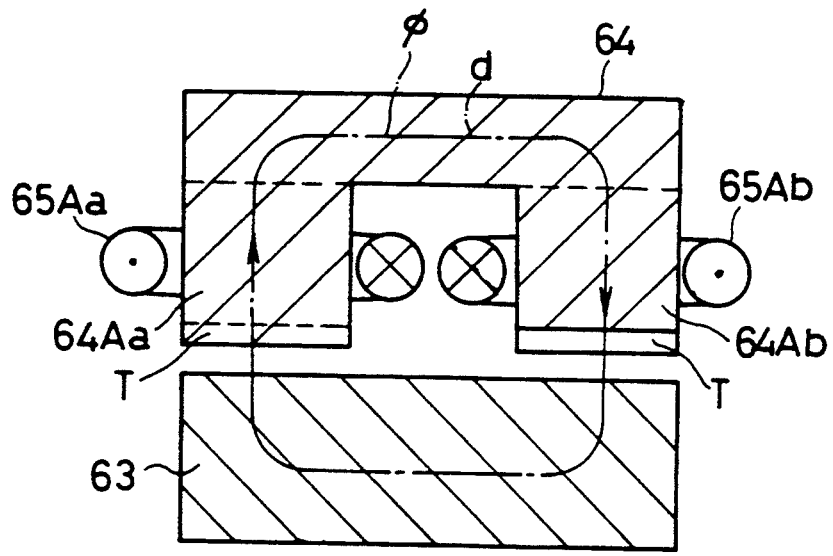
FIG. 34 is an enlarged cross-sectional view of a part of the rotary pulse motor of FIG. 32.

(2) A predetermined current is supplied to the paired coils 65Ba and 65Bb, 65Da and 65Db, 65Fa and 65Fb, and 65Ha and 65Hb. Main magnetic flux loops are formed between the stator 60 and the rotor 61. The magnetic flux flows through the path as the magnetic-pole 64Bb of the iron core 64→air gap→the S-polarized teeth 62a of the rotor 61 the permanent magnet 63 the N -polarized teeth 62a of the rotor 61 adjacent to the same S-polarized teeth 62a→air gap→the magnetic pole 64Ba→the axial path d as shown in FIG. 34 (but in opposite direction)→the magnetic pole 64Bb. The other magnetic flux loops are formed in the similar manner. As the result, the rotor 61 takes such a magnetically stable position that the end surfaces of the magnetic-poles 64Ba, 64Db, 64Fa and 64Hb are directly facing to the end surfaces of the N-polarized teeth 62a of the rotor 61, and the end surfaces of the magnetic poles 64Bb, 64Da, 64Fb and 64Ha are directly facing to the end surfaces of the S-polarized teeth 62a of the rotor 61.

The exciting mode of the above operation (1) and (2) is repeated. The rotor 61 is rotated.

Figure 35:
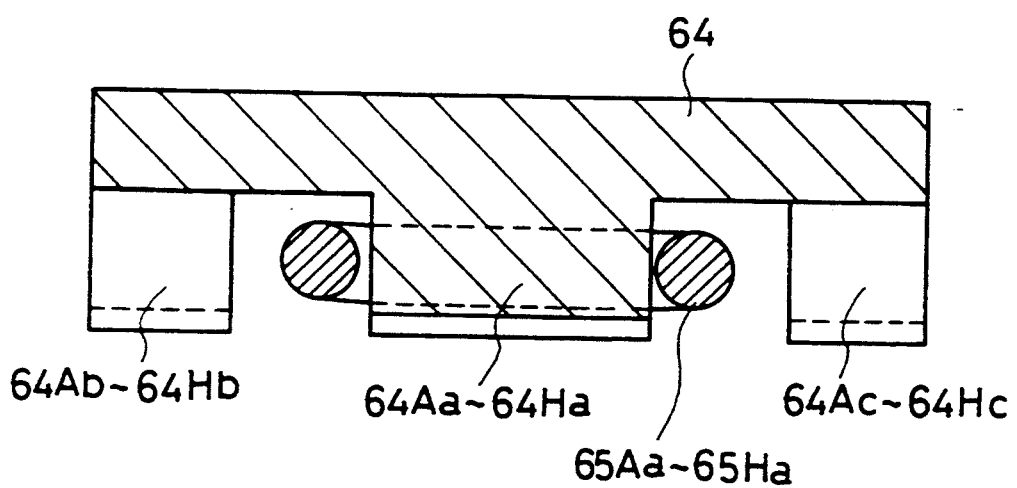
FIG. 35 is an enlarged cross-sectional view of an important part of a rotary pulse motor according to a seventh embodiment of this invention.

FIG. 35 shows a seventh embodiment of this invention.

In this embodiment, three rows of magnetic poles 64Aa to 64Ha, 64Ab to 64Hb and 64Ac to 64Hc are formed on the inner periphery of the iron core 64. Coils 65Aa to 65Ha are wound only on the central row of magnetic poles 64Aa to 64Ha. The two rows of magnetic poles 64Ab to 64Hb and 64Ac to 64Hc are shifted by 180 degrees from the central rows of magnetic pole 64Aa to 64Ha, respectively. The magnetic poles are formed at the same pitches as those of the sixth embodiment of FIG. 31, in the respective rows.

Figure 36:
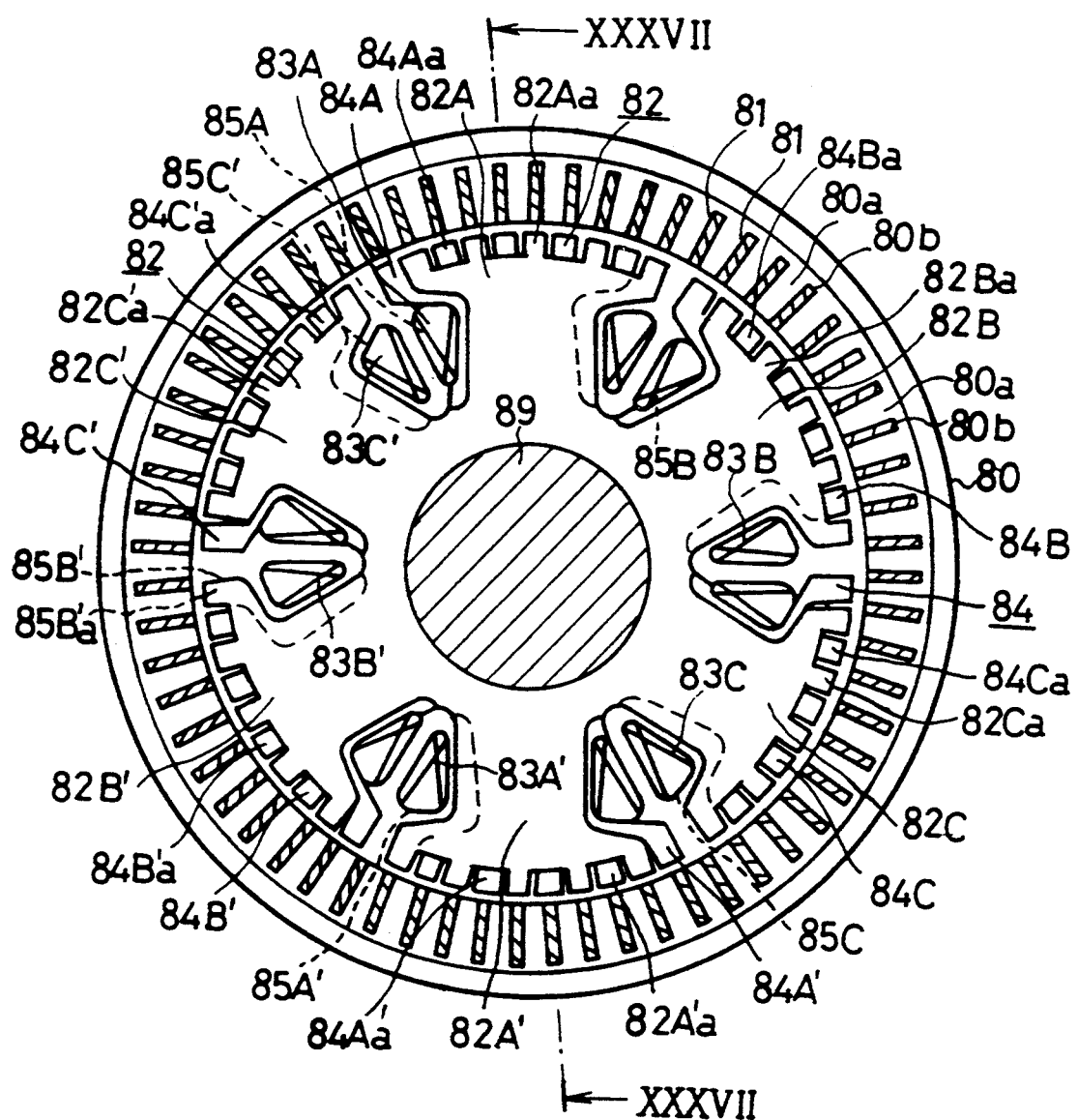
FIG. 36 is a schematic front view of a rotary pulse motor according to an eighth embodiment of this invention.
Figure 37:
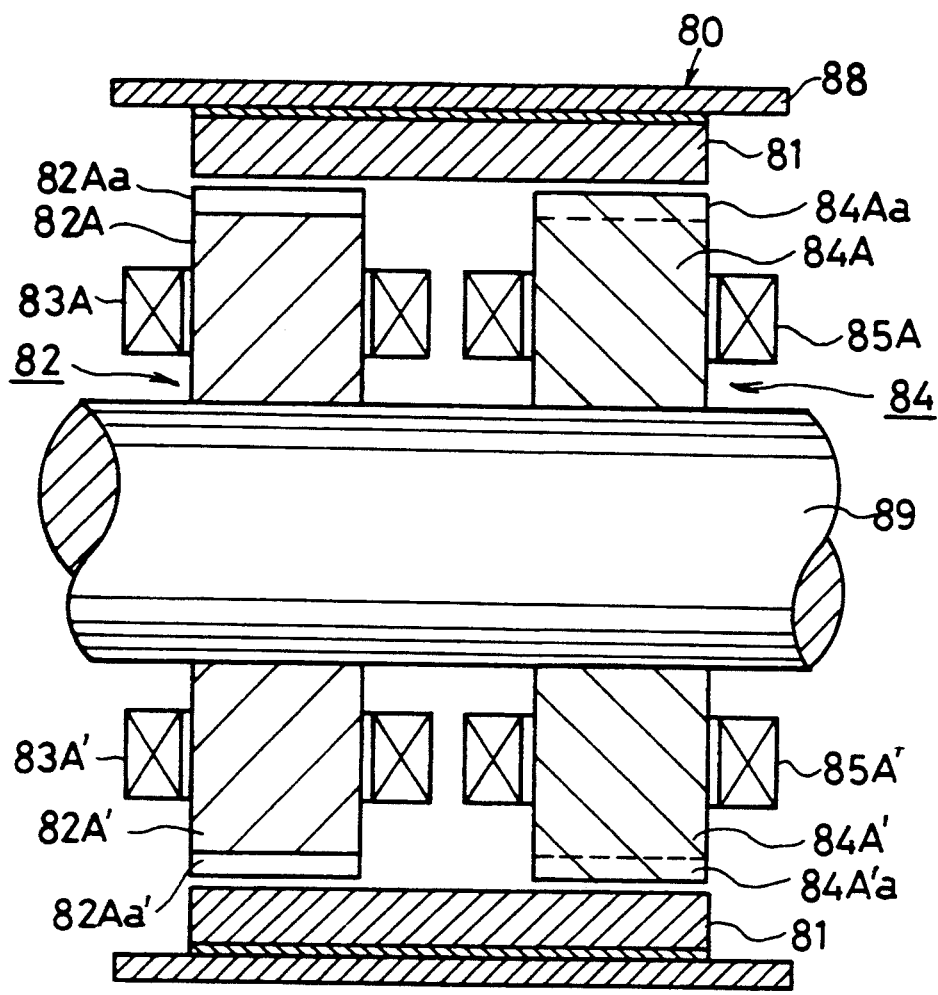
FIG. 37 is a cross-sectional view taken along the line XXXVII—XXXVII in FIG. 36.

FIG. 36 and FIG. 37 show an eighth embodiment of this invention.

A rotary pulse motor of this embodiment is of an outer-rotor type.

Teeth 80a, 80a,—and slit-like grooves 80b, 80b—are formed at an constant pitch of P/2 in an inner periphery of a cylindrical rotor 80 made of magnetic material. Permanent magnets 81, 81 are so inserted into the slit-like grooves 80b, 80b,—that the teeth 80a, 80a,—ore alternately magnetized in opposite polarities. A first cylindrical stator 82 is inserted concentrically into the cylindrical rotor 80 at a constant air gap G. Six magnetic poles 82A, 82B, 82C, 82A', 82B' and 82C' are formed at an angular regular pitch in a periphery of the first cylindrical stator 82. Coils 83A, 83B, 83C, 83A', 83B', and 83C' are wound on the magnetic poles 82A to 82C', respectively. Magnetic teeth 82Aa, 82Ba, 82Ca, 82A'a, 82B'a and 82C'a are formed on the top ends of the magnetic poles 82A to 82C'.

A second cylindrical stator 84 is inserted into the cylindrical rotor 80 and is arranged at the back of the first cylindrical stator 82, as shown in FIG. 37. They are spaced from each other by a predetermined length in the axial direction. Six magnetic poles 84A, 84B, 84C, 84A', 84B' and 84C' are formed at a regular angular pitch in a periphery of the second cylindrical stator 84. Coils 85A, 85B, 85C, 85A', 85B' and 85C' are wound on the magnetic poles 84A to 84C'. Teeth 84Aa to 84C'a are formed on the top ends of the magnetic poles 84A to 84C'. A shaft 89 is fixed to the aligned central holes of the first and second cylindrical stators 82 and 84. The magnetic poles 82Aa to 82C'a of the first cylindrical stator 82 are shifted by a pitch of P/2 from the magnetic poles 84Aa to 84C'a of the second cylindrical stator 84. The operation principle of this embodiment is the same as that of the sixth embodiment.

FIGS. 38 to FIG. 44 show a ninth embodiment of this invention.

A rotary pulse motor of this embodiment is of an outer-rotor type and two-phase type. A cylindrical stator 91 made of magnetic material and fixed to a shaft 97', is inserted concentrically into a cylindrical rotor 90 made of magnetic material at a constant air gap G.

The cylindrical rotor 90 is rotatably supported by a not-shown bearing mechanism. It is rotatable in the directions shown by the arrow M in FIG. 38.

Figure 39:
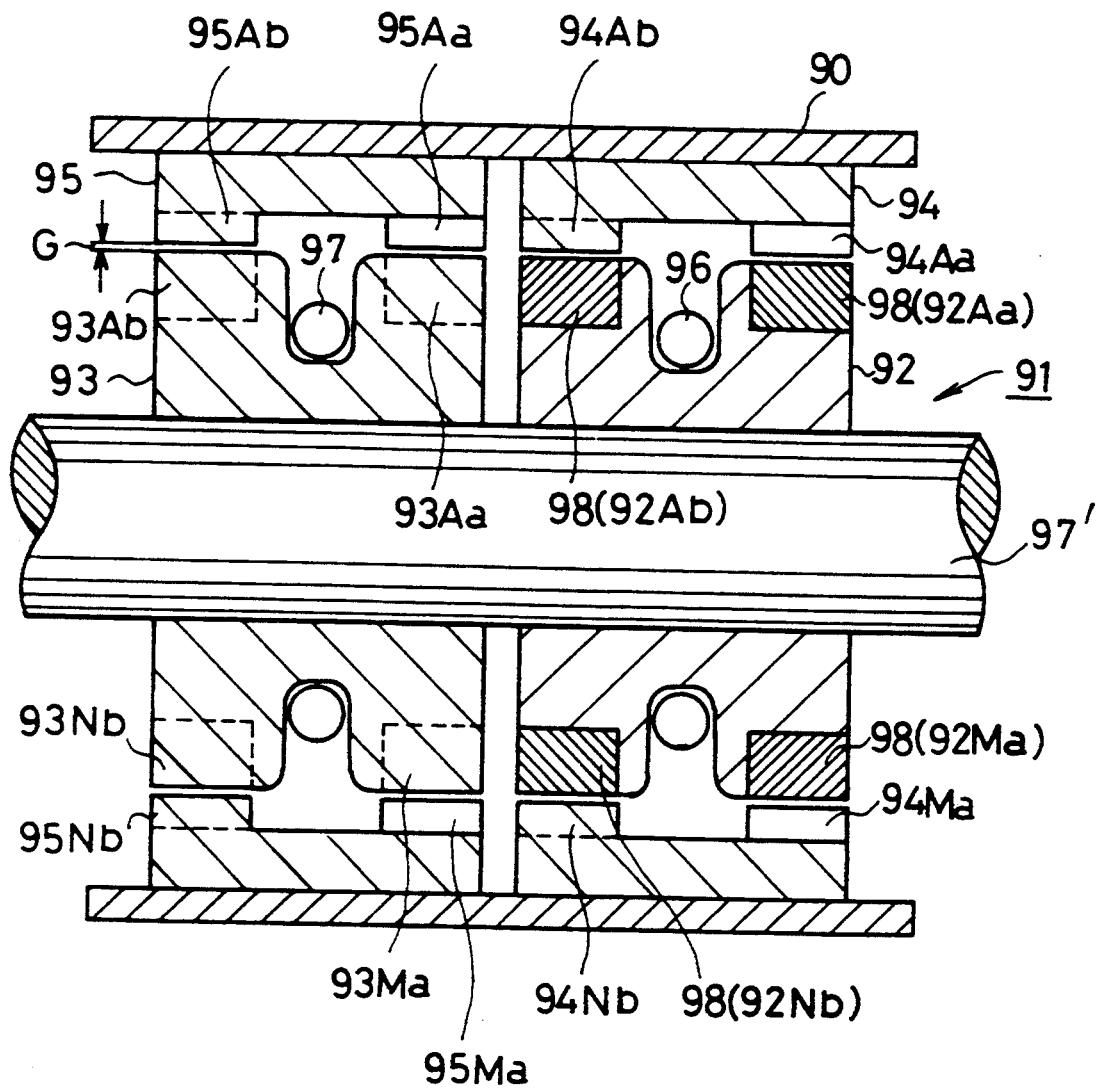
FIG. 39 is a cross-sectional view taken along the line XXXIX—XXXIX.

The cylindrical rotor 90 includes first and second magnetic sections 94 and 95 spaced from each other in an axial direction, as shown in FIG. 39. Two rows of magnetic teeth 94Aa to 94Ya and 94Ab to 94Yb are formed on an inner periphery of the first magnetic section 94. Magnetic teeth 94Aa to 94Ya, and 94Ab to 94Yb are formed at an angular regular pitch of P, respectively, and the phase of the former is equal to that of the latters.

Similarly, two rows of magnetic teeth 95Aa to 95Ya and 95Ab to 95Yb are formed on an inner periphery of the second magnetic section 95. Magnetic teeth 95Aa to 95Ya, and 95Ab to 95Yb are formed at an angular regular pitch of P, respectively, and the phase of the former is equal to that of the latter. Accordingly, the phases of all the magnetic poles 94Aa to 94Ya, 94Ab to 94Yb, 95Aa to 95Ya and 95Ab to 95Yb are equal to each other.

On the other hand, the cylindrical stator 91 consists of first and second cores 92 and 93 spaced from each other in the axial direction. As shown in FIG. 39, two rows of inductive teeth 92Aa to 92Ya and 92Ab to 92Yb are formed at an angular regular pitch in a periphery of the first core 92, facing to the magnetic teeth 94Aa to 94Ya and 94Ab to 94Yb. An annular groove is formed between the two rows. An annular coil 96 is wound on the groove.

Similarly, two rows of inductive teeth 93Aa to 93Ya and 93Ab to 93Yb are formed at an angular regular pitch in a periphery of the second core 93, facing to the magnetic teeth 95Aa to 95Ya and 95Ab to 95Yb. An annular groove is formed between the two rows. An annular coil 96 is wound on the groove.

Figure 40:
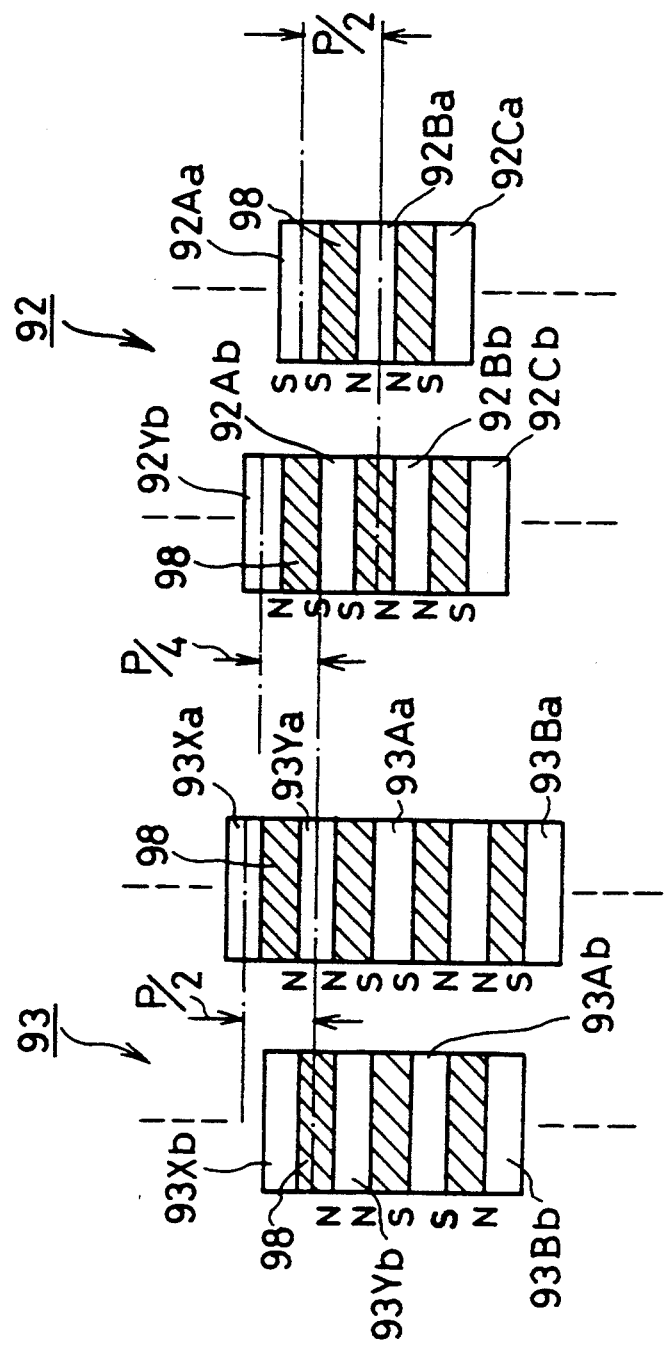
FIG. 40 is a schematic plan view for showing the relationships among the respective parts of the rotary pulse motor of FIG. 38.

As shown in FIG. 40, permanent magnets 98 are inserted into slit-like grooves between the inductive teeth 92Aa to 92Ya, 92Ab to 92Yb so that the inductive teeth 92Aa to 92Ya, 92Ab to 92Yb are magnetized alternately in opposite polarities. The pitches of the inductive teeth 92Aa to 92Ya, and 92Ab to 92Yb are equal to P/2, respectively. The one inductive teeth 92Aa to 92Ya are shifted by a pitch of P/4 from the other inductive teeth 92Ab to 92Yb.

Similarly, permanent magnets 98 are inserted into slit-like grooves between the inductive teeth 93Aa to 93Ya, 93Ab to 93Yb so that the inductive teeth 93Aa to 93Ya, 93Ab to 93Yb are magnetized alternately in opposite polarities. The pitches of the inductive teeth 93Aa to 93Ya, and 93Aa to 93Yb are equal to P/2, respectively. The one inductive teeth 93Aa to 93Ya are shifted by a pitch of P/4 from the other inductive teeth 93Ab to 93Yb.

The inductive teeth 92Aa to 92Ya and 92Ab to 92Yb of the first iron core 92 are shifted by a pitch of P/4 from the inductive teeth 93Aa to 93Ya and 93Ab to 93Yb of the second iron core 93.

Pulse currents are supplied to the coil 96 and 97, in the order as shown in FIG. 41 to FIG. 44. The rotor 90 is rotated P/4 by P/4 on the basis of the Soya's principle, as described for example, in the Japanese Patent Application No. 3019651988.

As shown in FIG. 41 to FIG. 44, magnetic fluxes flow through the axial core portions of the first or second cores 92 and 93.

Figure 41:
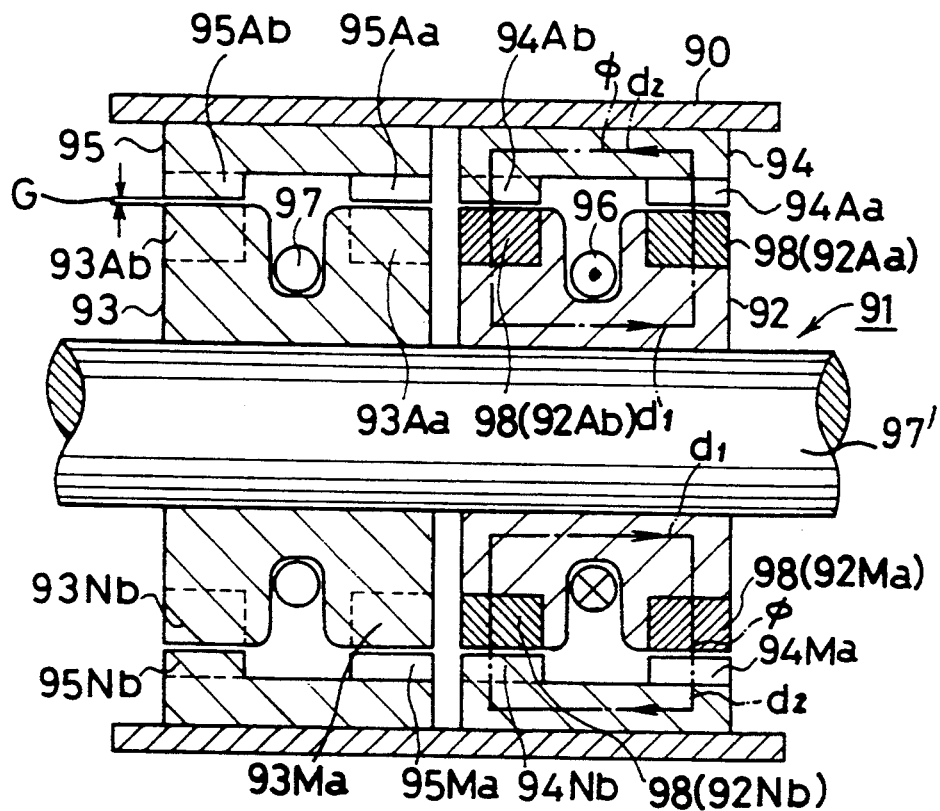
FIG. 41 is a cross-sectional view similar to FIG. 39 for explaining the operations of the rotary pulse motor of FIG. 38, in which a predetermined pulse current in one direction is supplied to the one coil.

In FIG. 41, a pulse current is flowed through the coil 96 in the shown direction. The magnetic flux $\phi$ flows through the path as the magnetic teeth 94Ab to 94Yb of the first iron core 94→air gap the S-polarized inductive teeth 92Ab to 92Yb→the adjacent N-polarized inductive teeth 92Ab to 92Yb→the axial core portion $d_1$→the S-polarized inductive teeth 92Aa to 92Ya of the other row→the adjacent N-polarized inductive teeth 92Aa to 92Ya→air gap G→the magnetic teeth 94Aa to 94Ya→ the axial core portions $d_2$→the magnetic teeth 94Ab to 94Yb.

Figure 42:
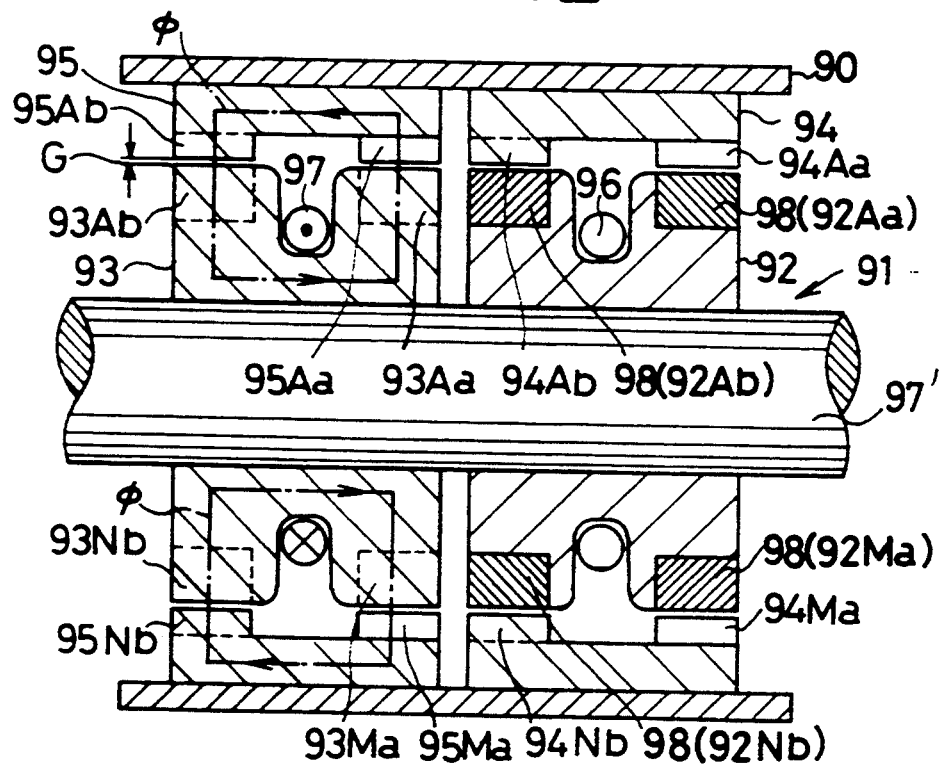
FIG. 42 is a cross-sectional view similar to FIG. 39 for explaining the operations of the rotary pulse motor of FIG. 38, in which a predetermined pulse current in one direction is supplied to the other coils.
Figure 43:
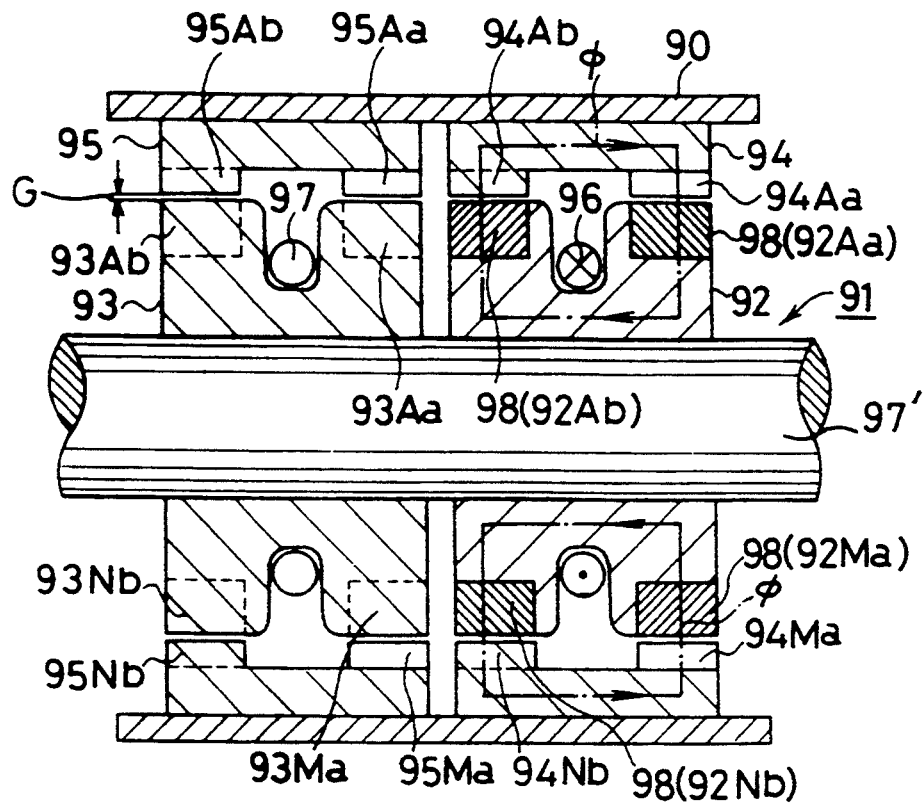
FIG. 43 is a cross-sectional view similar to FIG. 39 for explaining the operations of the rotary pulse motor of FIG. 38, in which a predetermined pulse current in the other direction is supplied to the one coils.
Figure 44:
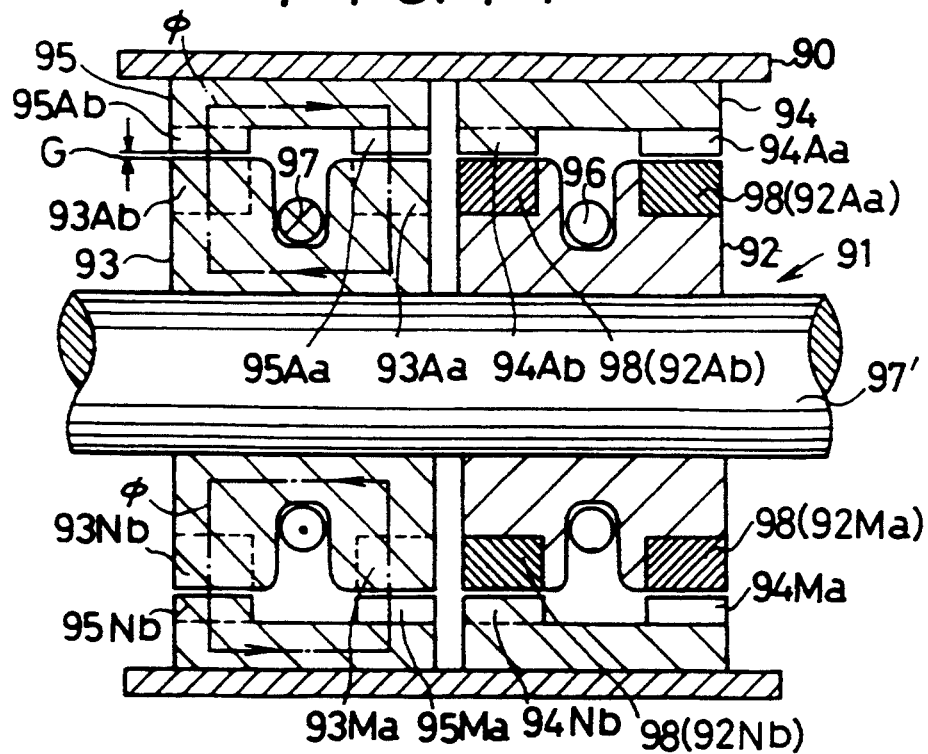
FIG. 44 is a cross-sectional view similar to FIG. 39 for explaining the operations of the rotary pulse motor of FIG. 38, in which a predetermined pulse current in the other direction is supplied to the other coil.

When the pulse currents are supplied to the coils 96 and 97 in the manners as shown in FIG. 42 to FIG. 44, the magnetic flux loops $\phi$ are similarly formed. The rotor 90 is stepwisely rotated.

Figure 45:
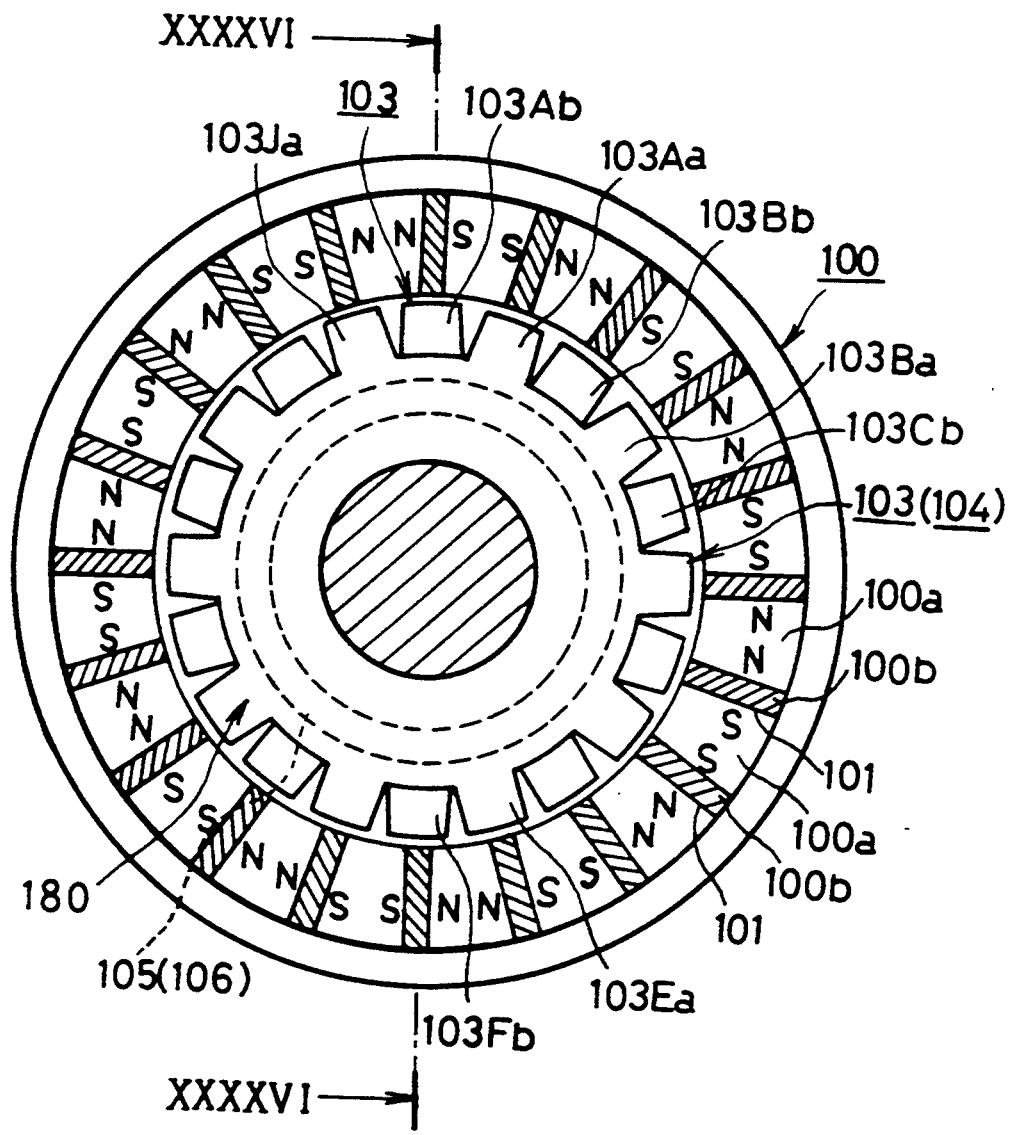
FIG. 45 is a schematic front view of a rotary pulse motor according to a tenth embodiment of this invention.
Figure 46:
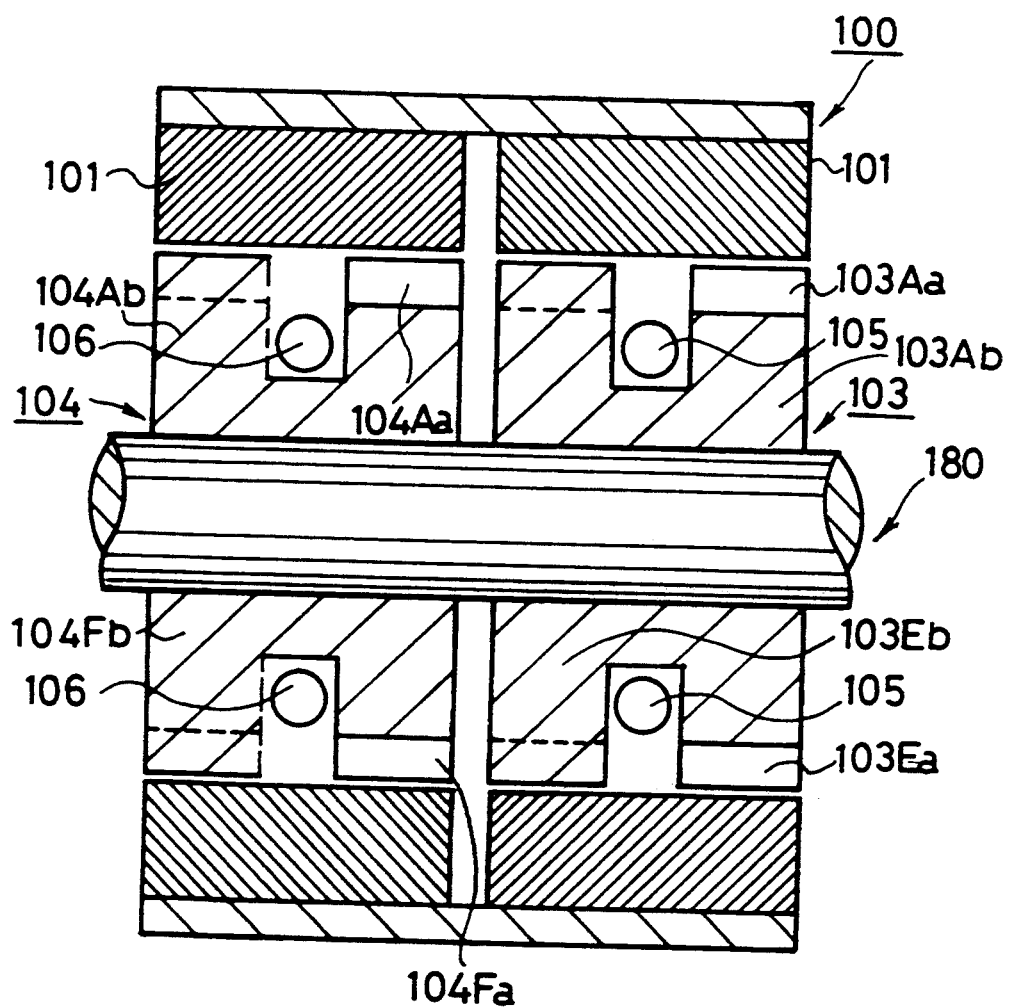
FIG. 46 is a cross-sectional view taken along the line XXXXVI—XXXXVI in FIG. 45.

FIG. 45 and FIG. 46 show a tenth embodiment of this invention.

A rotary pulse motor of this embodiment is of the outer-rotor type.

Teeth 100a, 100a,—and slit-like grooves 100b, 100b,—are alternately formed at a pitch of P/2 in an inner periphery of a cylindrical rotor 100 made of magnetic material. Permanent magnets 101, 101,—are so inserted into the slit-like grooves 100b, 100b, —that the teeth 100a, 100a are magnetized alternately in opposite polarities.

A cylindrical stator 180 inserted concentrically into the cylindrical rotor 100 consists of a first iron core 103 and a second iron core 104. Two rows of magnetic poles 103Aa to 103Ja and 103Ab to 103Jb are formed at an angular regular pitch of P in a periphery of the first iron core 103. An annular coil 105 is inserted in an annular groove made between the two rows, as shown in FIG. 46.

Two rows of magnetic poles 104Aa to 104Ja and 104Ab to 104Jb are formed at an angular regular pitch of P in a periphery of the second iron core 104. An annular coil 106 is inserted in an annular groove made between the two rows, as shown in FIG. 46. The one row of magnetic poles 103Aa to 103Ja is shifted by a pitch of P from the other row of magnetic poles 103Ab to 103Jb in the first iron core 103. The pitch P corresponds to 360 degrees.

Similarly, the one row of magnetic poles 104Aa to 104Ja is shifted by a pitch of P from the other row of magnetic poles 104Ab to 104Jb in the second iron core 104. The pitch P corresponds to 360 degrees. The inductive teeth or magnetic poles 103Aa to 103Ja of the first iron core 103 are shifted by a pitch of P/2 from the inductive teeth or magnetic poles 104Ab to 104Jb of the second iron core 104.

The advantages of the above embodiments are as follows:

(1) Main magnetic flux loops pass through the axial magnetic path in the stator and rotor. The magnetic flux is not limited by the narrow path between the inner ends of the permanent magnets. Accordingly, the teeth are not saturated with magnetic flux in contrast to the prior art rotary pulse motors. Therefore, a larger torque can be obtained.

(2) Since the magnetic flux loop passes through only the one permanent magnet, the magnetic motive force by the coil energization can be smaller than those of the prior art rotary pulse motor. Accordingly, the rotary pulse motor can be small-sized, and the required amount of copper as material for the coils can be smaller than the prior art rotary pulse motors. The ratio of the torque to the weight of the rotary pulse motor can be improved.

(3) The annular coils are wound in the annular grooves between the rows of the magnetic poles or teeth, respectively, in some of the embodiments, such as the embodiment of FIG. 19A. Accordingly, the number of the coils can be smaller and the coil mounting operation can be simplified. The manufacturing can be easy.

Figure 38:
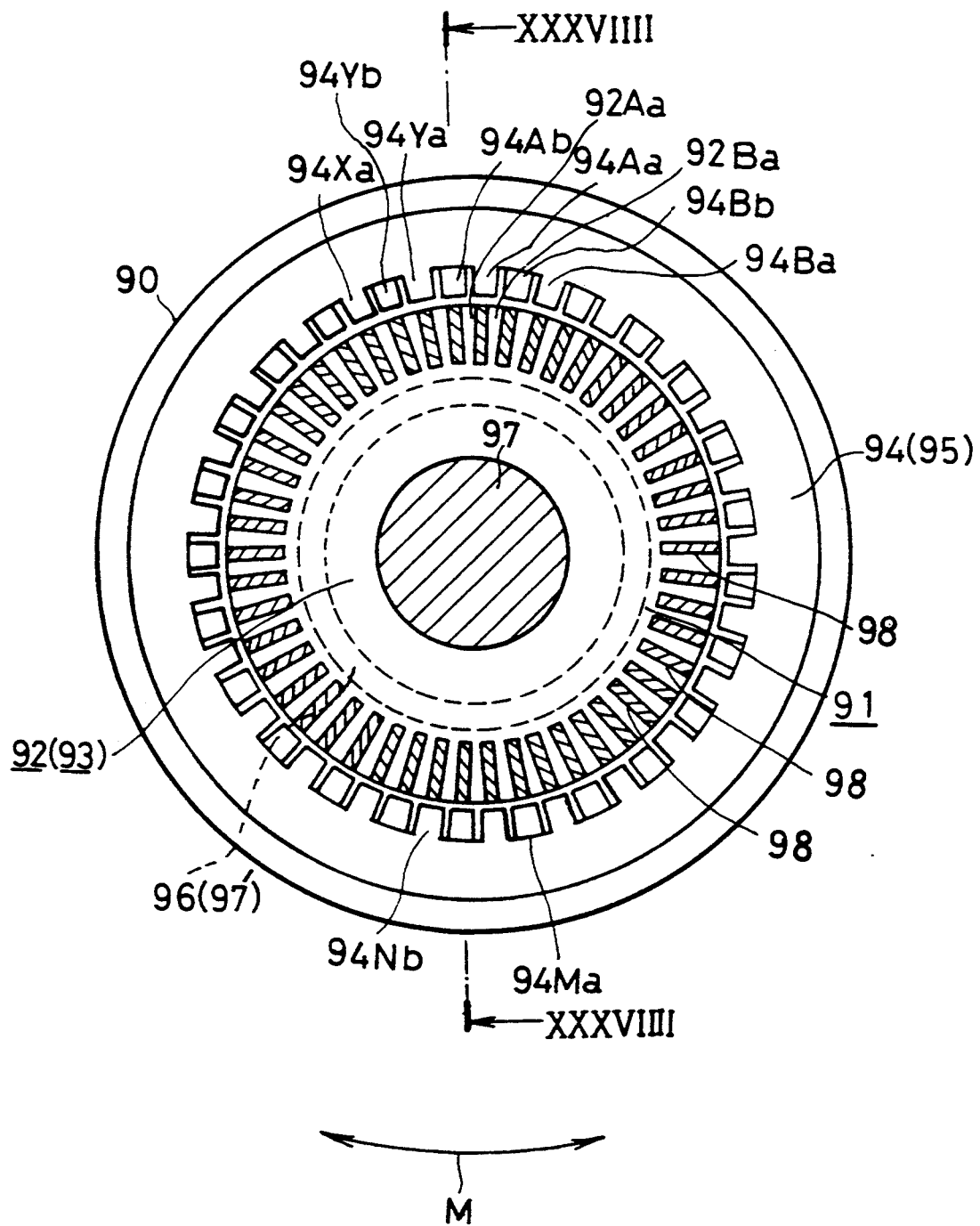
FIG. 38 is a schematic front view of a rotary pulse motor according to a ninth embodiment of this invention.

(4) In some of the above embodiments such as the embodiment of FIG. 38, since the magnetic flux flows through the whole peripheral portion of the secondary rotor, the flux density is low. Accordingly, the thickness of the secondary rotor can be smaller. Lower inertia and small-sizing are possible.

(5) The peripheral surfaces of the stator and rotor, facing to each other can be effectively used for generating torque. Accordingly, a larger torque can be obtained than in the prior art rotary pulse motor.

While the preferred embodiments have been described, variations thereto will occur to those skilled in the art within the scope of the present inventive concepts which are delineated by the following claims.

Figure 10:
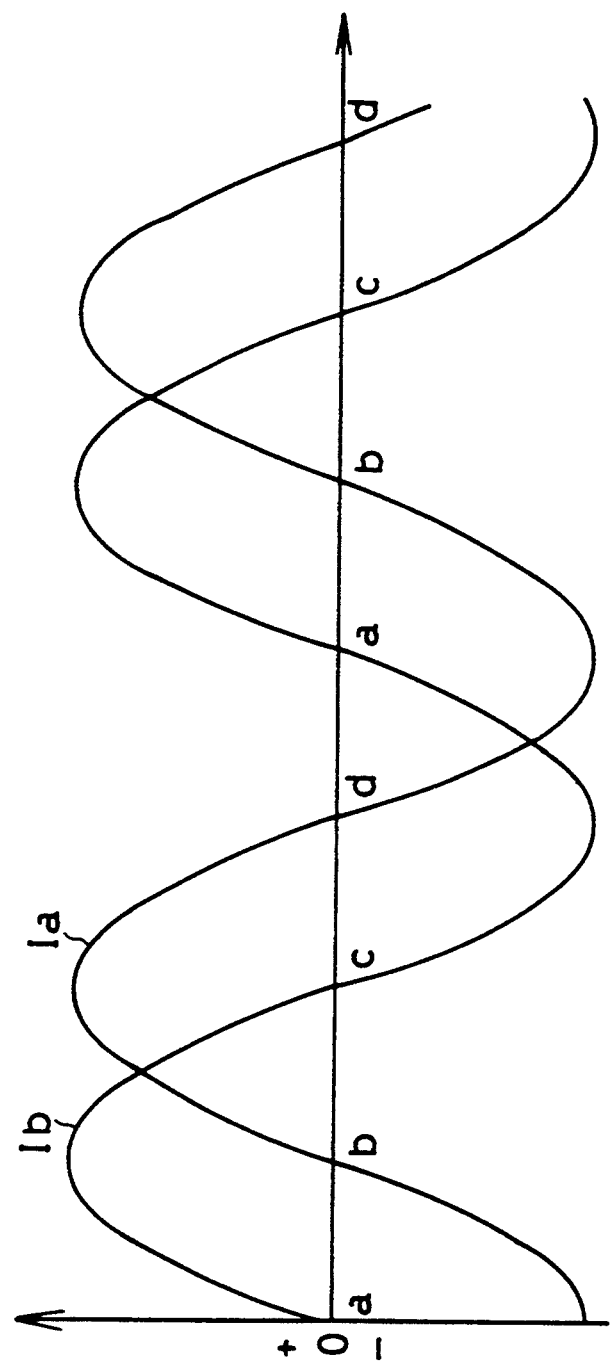
FIG. 10 is a chart of driving currents for two-phase excitation.

For example, the pulse currents are supplied too the coils by the two-phase excitation method in the above embodiment. Instead, alternating currents Ia and Ib as shown in FIG. 10, which are different by 90 degrees in phase from each other, may be supplied to the coils. For example, in the first embodiment, the alternating currents Ia and Ib for A-phase and B-phase may be supplied to the terminals Ta, and Tb, and Tc and Td, respectively. Three-phase alternating currents which are different by 120 degrees in phase from one another, may be used for the three-phase excitation.

A sensor may be provided on the stator (primary) so as to detect a relative movement to the rotor (secondary). In such a case, the rotary pulse motor can be used as a servo-motor. For example, the sensor may be provided on the cylindrical stator 40 to detect the relative movement of the rotor 41, in the first embodiment of FIG. 7.

Figure 33:
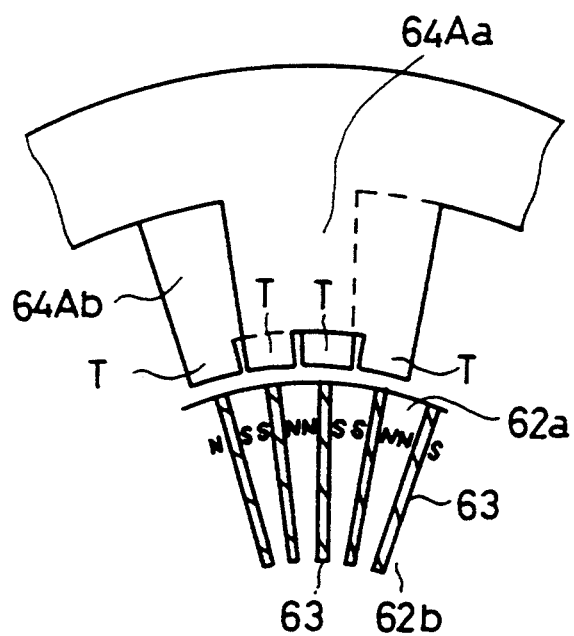
FIG. 33 is an enlarged front view of a part of the rotary pulse motor of FIG. 31.

Further in the embodiment of FIG. 31 to FIG. 33, the one row of magnetic poles 64Aa to 64Ha is shifted by P/2 from the other row of the magnetic poles 64Ab to 64Hb, and the rotary pulse motor is of the one-phase. They are formed on the one iron core 64.

Instead, plural (n: integral number) cores may be arranged in the axial direction. In that case, the magnetic poles on the cores are shifted by P/n (n-phase) in a peripheral direction from those on the adjacent ones.

Figure 30:
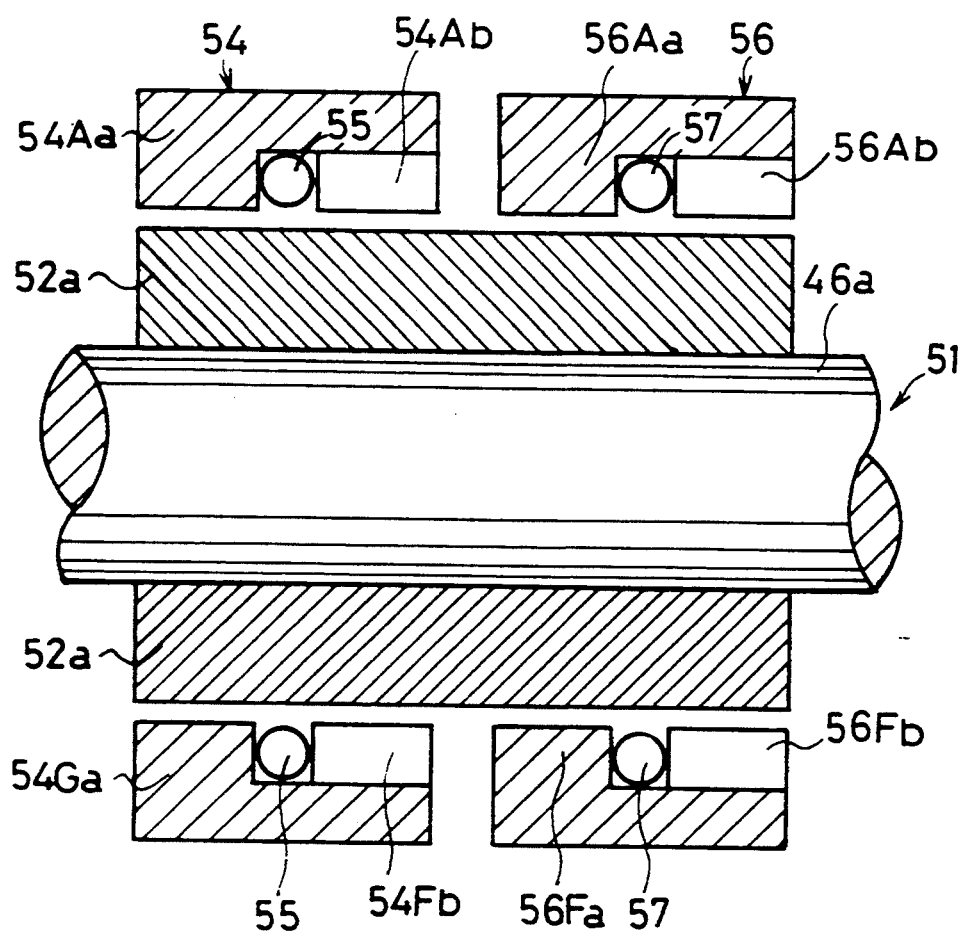
FIG. 30 is a cross-sectional view taken along the line XXX—XXX in FIG. 29.

Further in the embodiment of FIG. 30 and FIG. 37, the stator includes the first core 82 and the second core 84. It is of the two-phase type. Insteads, plural (n: integral number) cores may be arranged in the axial direction. The magnetic poles on the cores are shifted by P/n (n-phase) in a peripheral direction from those on the adjacent ones.

In the first to third embodiments, the rotor 41 (secondary) is inserted concentrically into the stator 40 (primary). The stator and the rotor may be substituted with each other. In such a case, the outer cylindrical member 40 is rotatably supported, and the inner cylindrical member 41 is stationary.

In the above embodiments, the surfaces of the magnetic poles and teeth are flat, facing to each other. A skewed or inclined groove may be made in the surfaces of the magnetic poles or teeth, in order to improve the torque characteristics.

In the fourth embodiment, the stator 50 consists of the first and second iron cores 54 and 56, and the coils 55 and 57 are wound on them. Thus, the rotary pulse motor of the fourth embodiment is of the two-phase type. The number of the iron cores may be larger. When it is three (three-phase), the phase difference is equal to P3. When it is five (five-phase), the phase difference is equal to P5. And when it is n (integral number), the phase difference is equal to P/n, although it is equal to P/4 in the fourth embodiment.

in the ninth embodiment, the stator 91 consists of the first and second iron cores 92 and 93, and the coils 96 and 97 are wound on them. Thus, the rotary pulse motor of the ninth embodiment is of the two-phase type. The number of the iron cores may be larger. When it is three (three-phase), the phase difference between the iron cores is equal to P3. When it is five (five-phase), the phase difference between the iron cores is equal to P5. And when it is n (integral number), the phase difference between the iron cores is equal to P/n, although it is equal to P/4 in the ninth embodiment. In that case, the number of the core sections (94 and 95 in the ninth embodiment) is increased in accordance with the number of the iron cores.

What is claimed is:

1. In a rotary pulse motor comprising:
    (A) a first cylindrical magnetic-path forming means made of magnetic material;
    (B) a second cylindrical magnetic-path forming means made of magnetic material and inserted concentrically into said first cylindrical magnetic-path forming means, said first cylindrical magnetic-path forming means or said second cylindrical magnetic-path forming means being rotatably supported;
    (C) slit-like grooves formed at a regular angular pitch P/2 in a peripheral portion of one of said first and second cylindrical magnetic-path forming means;
    (D) teeth formed between said slit-like grooves;

(E) permanent magnets inserted into said slit-like grooves and so arranged that the magnetic polarities of said teeth are alternately inverted;

(F) magnetic-pole means formed at a regular angular pitch of a constant multiplier of said P/2, in the other of said first and second cylindrical magnetic-path forming means, said magnetic-pole means facing to said teeth at a constant air gap in the radial direction, and (G) coil means provided on the other of said first and second cylindrical magnetic-path forming means so as to generate magnetic flux through said air gap, the improvement comprising: the other of said first and second cylindrical magnetic-path forming means comprises plural cylindrical core portions magnetically combined with each other and arranged in the axial direction of said first and second cylindrical magnetic-path forming means, and said magnetic-pole means comprises plural rows of magnetic poles formed on the respective core portions of the other of said first and second cylindrical magnetic-path forming means, said magnetic poles of the respective rows being angularly shifted from one another by a pitch of a predetermined multiplier of said P;

whereby a magnetic flux flows through a path passing in succession through—an N-polarized magnetic pole of one of said rows—said air gap—an adjacent S-polarized one of said teeth of said one of the first and second cylindrical magnetic-path forming means—an axial path in said one of the first and second cylindrical path forming means along said permanent magnet—an N-polarized one of said teeth adjacent to said adjacent S-polarized one—said air gap—an S-polarized magnetic pole of another of said rows, adjacent to said N-polarized magnetic pole of the one of said rows—another axial path in said other of the first and second cylindrical magnetic path forming means—and returning to the original N-polarized magnetic pole to complete the path, when said coil means is energized.

2. A rotary pulse motor according to claim 1, in which said second cylindrical magnetic-path forming means includes a central axial hole and is rotatably supported by a shaft fixed at said central axial hole, said first cylindrical magnetic-path forming means comprises a first cylindrical core portion and a second cylindrical core portion as said core portions, magnetically combined with each other, one row of said magnetic poles of said first cylindrical core portion angularly by the pitch of P/2 in one rotational direction, and said coil means comprises coil portions wound on said magnetic poles of said first and second cylindrical core portions, respectively.

3. A rotary pulse motor according to claim 1, in which said second cylindrical magnetic-path forming means includes a central axial hole and is rotatably supported by a shaft fixed at said central axial hole, said first cylindrical magnetic-path forming means comprises a first cylindrical core portion, a second cylindrical core portion and a third cylindrical core portion as said core portions, magnetically combined with each other, respective rows of said magnetic poles of said second and third cylindrical core portion being shifted from the row of said magnetic-poles of said first cylindrical core portion, arranged in the midst of said second and third cylindrical core portions, angularly by said pitch of P/2, and said coil means comprises coil portions wound on said magnetic poles of said first cylindrical core portion, respectively.

4. A rotary pulse motor according to claim 2 or 3, in which said shaft is made of non-magnetic material, said slit-like grooves extend to said shaft, and said permanent magnets contact with said shaft.

5. A rotary pulse motor according to claim 2 or 3, in which plural pole teeth are formed at a regular pitch in top end portions of said magnetic poles, the width of said pole teeth being substantially equal to that of the first mentioned said teeth.

6. A rotary pulse motor according to claim 1, in which said first cylindrical magnetic-path forming means is rotatably supported, said second cylindrical magnetic-path forming means comprises a first cylindrical core portion and a second cylindrical core portion as said core portion, said magnetic-poles of the first and second cylindrical core portions are formed at a pitch of a constant multiplier of P/2, respectively, one row of said magnetic poles of said first cylindrical core portion being shifted angularly from another row of said magnetic-poles of said second cylindrical core portion by said pitch of P/2 in one rotational direction and said coil means comprises coil portions wound on said magnetic poles of said first and second cylindrical core portions, respectively, and plural pole teeth are formed at a regular pitch in top end portions of said magnetic poles, the width of said pole teeth being substantially equal to that of the first mentioned of said teeth.

7. A rotary pulse motor according to claim 1, in which said second cylindrical magnetic-path forming means includes a central axial hole and is rotatably supported by a shaft fixed at said central axial hole, said first cylindrical magnetic-path forming means comprises a first cylindrical core and a second cylindrical core as said core portions, each of said first and second cylindrical cores consisting of first and second cylindrical portions, magnetically combined with each other, respectively, said magnetic-poles of said first and second cylindrical portions being formed at a pitch of a constant multiplier of P/2, respectively, one row of said magnetic poles of said first cylindrical portion being shifted angularly from the other row of said magnetic-poles of said second cylindrical portion by the pitch of P/2 is one rotational direction, said magnetic poles of said first and second cylindrical portions of said first cylindrical core being shifted angularly from those of said second cylindrical core by the pitch of P/4 in said one rotational direction, and said coil means comprises first and second coil portions inserted into annular grooves between said rows of magnetic poles of said first and second cylindrical cores, respectively.

8. A rotary pulse motor according to claim 7, in which said first and second cylindrical portions of said first and second cylindrical cores are dividable from each other, respectively.

9. A rotary pulse motor according to claim 7, in which said shaft is made of non-magnetic material, said slit-like grooves extend to said shaft, and said permanent magents contact with said shaft.

10. A rotary pulse motor according to claim 1, in which said first cylindrical magnetic-path forming means is rotatably supported, said first cylindrical magnetic-path forming means comprises a first cylindrical core and a second cylindrical core, said magnetic-poles in said first and second cylindrical cores are formed in two rows at the pitch of a constant multiplier of P/2, respectively, one row of said magnetic poles of said first and second cylindrical core being shifted angularly from the other row of said magnetic-poles of said first and second cylindrical cores by the pitch of P/2 in one rotational direction, said magnetic poles of said first cylindrical core being shifted angularly from those of said second cylindrical core by the pitch of P/4 in said one rotational direction, said second cylindrical magnetic-path forming means comprises a first cylindrical core portion and a second cylindrical core portion, as said core portions, each of said first and second cylindrical core portions consisting of first and second cylindrical parts, said teeth being formed in said first cylindrical part and said second cylindrical part, and said coil means comprises first and second coil portions inserted into annular grooves between said first and second cylindrical parts, respectively.

11. A rotary pulse motor according to claim 1, in which said first cylindrical magnetic-path forming means is rotatably supported, said teeth are formed in said first cylindrical magnetic-path forming means, said second cylindrical magnetic-path forming means comprises a first cylindrical core portion and a second cylindrical core portion as said core portions, consisting of first and second cylindrical parts, said magnetic-poles in said first and second cylindrical core parts being formed at the pitch of a constant multiplier of P/2, respectively, one row of said magnetic poles of said first cylindrical core part being shifted angularly from the other row of said magnetic-poles of said second cylindrical core part by the pitch of P/2 in one rotational direction, said magnetic poles of said first cylindrical core portion being shifted angularly from those of said second cylindrical core portion by the pitch of P/4 in said one rotational direction, and said coil means comprises first and second coil portions inserted into annular grooves between said first and second cylindrical parts, respectively.

12. A rotary pulse motor according to claim 1, in which said second cylindrical magnetic-path forming means includes a central axial hole and is rotatably supported by a shaft fixed at said central axial hole, said first cylindrical magnetic-path forming means comprises plural (n:integral) cylindrical cores as said core portions, each of said plural cylindrical cores consisting of first and second cylindrical portions, magnetically combined with each other, respectively, said magnetic-poles of said first and second cylindrical portions are formed at a pitch of a constant multiplier of P/2, respectively, one row of said magnetic poles of said first cylindrical portion being shifted angularly from the other row of said magnetic-poles of said second cylindrical member by the pitch of P/2 in one rotational direction, said magnetic poles of said plural (n>2) cylindrical cores being shifted angularly from those of the adjacent said cylindrical core by the pitch of P/n in said one rotational direction, and said coil means comprises coil portions inserted into annular grooves between said rows of magnetic poles of said first and second cylindrical portions, respectively.

13. A rotary pulse motor according to claim 12, in which the respective said first and second cylindrical portions of said plural cylindrical cores are dividable from each other, respectively.

14. A rotary pulse motor according to claim 12, in which said shaft is made of non-magnetic material, said slit-like grooves extend to said shaft, and said permanent magnets contact with said shaft.

15. A rotary pulse motor according to claim 1, in which said second cylindrical magnetic-path forming means is rotatably supported, said first cylindrical magnetic-path forming means comprises plural (n; integral) pairs of a first cylindrical core portion and a second cylindrical core portion as said core portions, said magnetic-poles of said first and second cylindrical core portions being formed at a pitch of a constant multiplier of P/2, respectively, one row of said magnetic poles of said first cylindrical core portion being shifted angularly from the other row of said magnetic-poles of said second cylindrical core portion by the pitch of P/2 in one rotational direction and said coil means comprises coil portions wound on said magnetic poles said first and second cylindrical core portions, respectively, and plural pole teeth are formed at a regular pitch in a top end portion of said magnetic poles, the width of said pole teeth being substantially equal to that of the first mentioned said teeth of said first cylindrical magnetic-path forming means, and the phase difference between said pairs is equal to P/n (n<1).

16. A rotary pulse motor according to claim 1, in which said second cylindrical magnetic-path forming means is rotatably supported, said first cylindrical magnetic-path forming means comprises plural (n: integral) core portions as said core portions arranged in the axial direction said magnetic-poles of said plural core members being formed at a pitch of a constant multiplier of P/2, respectively, said rows of magnetic poles of said cylindrical core portions being shifted angularly from said rows of magnetic-poles of the adjacent said cylindrical core portion by the pitch of P/n in one rotational direction, said coil means comprises coil portions wound on said magnetic poles of said plural cylindrical core portions, respectively, and plural pole teeth are formed at a regular pitch in a top end portion of said magnetic poles, the width of said pole teeth being substantially equal to that of the first mentioned said teeth of said first cylindrical magnetic-path forming means.

17. A rotary pulse motor according to claim 1, in which said second cylindrical magnetic-path forming means is rotatably supported, said first cylindrical magnetic-path forming means comprises plural (n:integral) cylindrical cores, said magnetic-poles in said plural cylindrical cores are formed in two rows at the pitch of a constant multiplier of P/2, respectively, one row of said magnetic poles of said plural cylindrical cores being shifted angularly from the other row of said magnetic-poles of said plural cylindrical cores by the pitch of P/2 in one rotational direction, respectively, said magnetic poles of said cylindrical cores being shifted angularly from those of the adjacent said cylindrical cores by the pitch of P/n (n>2) in said one rotational direction, said second cylindrical magnetic-path forming means comprises plural cylindrical core portions as said core portions each of said cylindrical core portions consisting of first and second cylindrical parts, said teeth being formed in said first cylindrical part and said second cylindrical part, and said coil means comprises coil portions inserted into annular grooves between said first and second cylindrical parts, respectively.

18. A rotary pulse motor according to claim 1, in which said first cylindrical magnetic-path forming means is rotatably supported, said teeth are formed in said first cylindrical magnetic-path forming means, said second cylindrical magnetic-path forming means comprises plural (n:integral) cylindrical core portions as said core portions, each of said cylindrical core portions consisting of first and second cylindrical parts, said magnetic-poles in said first and second cylindrical core parts being formed at the pitch of a constant multiplier of P/2, respectively, one row of said magnetic poles of said first cylindrical core part being shifted angularly from the other row of said magnetic-poles of said second cylindrical core part by the pitch of P/2 in one rotational direction, said magnetic poles of said cylindrical core portions being shifted angularly from those of the adjacent said cylindrical core portion by the pitch of P/n (n>2) in said one rotational direction, and said coil means comprises coil portions inserted into annular grooves between said first and second cylindrical parts, respectively.

* * * * *

UNITED STATES PATENT AND TRADEMARK OFFICE
CERTIFICATE OF CORRECTION

PATENT NO. : 5,334,894  
DATED : August 2, 1994  
INVENTOR(S) : Hiroshi Nakagawa Page 1 of 6

It is certified that error appears in the above-indentified patent and that said Letters Patent is hereby corrected as shown below:

On the title page, item [57]

Line 12, delete "a" after "so as to".

Line 18, insert - - by - - after "each other".

Col. 2, line 10, insert - - is - - before "not so".

Col. 2, line 20, amend "25C," to - - 26C, - - after "26A, 26B".

Col. 4, line 11, insert - - ; - - after "energized".

Col. 4, line 24, insert - - ; - - after "FIG. 19A".

Col. 4, line 29, delete ":" after "one coil".

Col. 4, line 34, amend "tile" to - - the - - after "for explaining".

UNITED STATES PATENT AND TRADEMARK OFFICE
CERTIFICATE OF CORRECTION

PATENT NO. : 5,334,894
DATED : August 2, 1994
INVENTOR(S) : Hiroshi Nakagawa

It is certified that error appears in the above-indentified patent and that said Letters Patent is hereby corrected as shown below:

Col. 5, line 48, insert - - polarities - - after "in opposite".

Col. 5, line 49, delete "polarities" after "pitch P".

Col. 6, line 6, insert - - , - - after "and so forth".

Col. 6, line 52, insert - - of - - after "teeth 42a".

Col. 7, line 8, amend " 41" " to - - 41→ -- before "the permanent".

Col. 7, line 8, "43" should read —43→ — after "magnet".

Col. 7, line 12, amend "ion" to - - in - - after "shown".

Col. 7, line 60, amend "4Bb" to - - 44Bb - - after "pole".

Col. 7, line 67, amend "410" to - - 41 - - after "the rotor".

Col. 8, line 2, amend "corot" to - - rotor - - after "of the".

Col. 8, line 11, insert - - In - - before "the first".

Col. 8, line 30, delete "," after "material".

Col. 8, line 32, amend "Of" to - - of - - before "the one".

Col. 9, line 15, amend "of" to - - at - - after "shifted".

UNITED STATES PATENT AND TRADEMARK OFFICE
CERTIFICATE OF CORRECTION

PATENT NO. : 5,334,894
DATED : August 2, 1994
INVENTOR(S) : Hiroshi Nakagawa

It is certified that error appears in the above-indentified patent and that said Letters Patent is hereby corrected as shown below:

Col. 9, line 23, amend "Ditch P" to -- pitch P -- after "The".

Col. 9, line 63, insert -- too. -- after "56Jb,".

Col. 10, line 24, delete "." after "path as".

Col. 10, line 27, insert -- G -- after "air gap".

Col. 10, line 28, insert -- 56 -- after "iron core".

Col. 10, line 50, amend ", not" to -- rather than -- after "material".

Col. 10, line 62, insert -- → -- after "56Hb".

Col. 11, line 36, amend "Bb," to -- 64Bb, -- after "64Ab and".

Col. 11, line 40, amend "Ab" to -- 64Ab -- after "poles".

Col. 11, line 46, amend "Ba" to -- 65Ba -- after "coils".

Col. 11, line 47, amend "Hb" to -- 65Hb -- after "and".

UNITED STATES PATENT AND TRADEMARK OFFICE
CERTIFICATE OF CORRECTION

PATENT NO. : 5,334,894
DATED : August 2, 1994
INVENTOR(S) : Hiroshi Nakagawa

It is certified that error appears in the above-indentified patent and that said Letters Patent is hereby corrected as shown below:

Col. 11, line 49, insert - - to - - after "64Bb,".

Col. 11, line 61, amend "mariner" to - - manner - - after "in the".

Col. 12, line 31, insert - - → - - after "rotor 61".

Col. 12, line 32, insert - - → - - after "63".

Col. 12, line 66, insert - - — - - after "81, 81".

Col. 12, line 67, amend "ore" to - - are - - after "80a, --".

Col. 13, line 27, delete "FIG." after "FIGS. 38 to".

Col. 13, line 45, amend "latters." to - - latter. - - after "of the".

Col. 14, line 27, amend "3019651988" to - - 301965/1988 - - after "Application NO."

Col. 14, line 34, insert - - → - - after "air gap".

Col. 15, line 53, amend "too" to - - to - - after "supplied".

Col. 16, line 12, amend "30" to - - 36 - - after "of FIG.".

Col. 16, line 36, amend "P3." to - - P/3. - - before "When".

UNITED STATES PATENT AND TRADEMARK OFFICE
CERTIFICATE OF CORRECTION

PATENT NO. : 5,334,894
DATED : August 2, 1994
INVENTOR(S) : Hiroshi Nakagawa

It is certified that error appears in the above-indentified patent and that said Letters Patent is hereby corrected as shown below:

Col. 16, line 37, amend "P5." to - - P/5. - - after "equal to".

Col. 16, line 40, amend "in" to - - In - - before "the ninth".

Col. 16, line 46, amend "P3." to - - P/3. - - after "equal to".

Col. 16, line 47, amend "P5." to - - P/5. - - after "equal to".

Col. 17, line 51, insert the following after "core portion", - - being shifted from the other row of said magnetic-poles of said second cylindrical core portion - -.

Col. 18, line 18, amend "portion," to - - portions, - - after "said core".

Col. 18, line 46, amend "is to - - in - - after "P/2".

Col. 19, line 10, delete "," before "as".

Col. 19, line 24, insert the following before "consisting", - - each of said first and second cylindrical core portions - -.

UNITED STATES PATENT AND TRADEMARK OFFICE
CERTIFICATE OF CORRECTION

PATENT NO. : 5,334,894
DATED : August 2, 1994
INVENTOR(S) : Hiroshi Nakagawa

It is certified that error appears in the above-indentified patent and that said Letters Patent is hereby corrected as shown below:

Col. 19, line 61, amend "," to - - . - - after "claim 12".

Col. 20, line 14, insert - - of - - after "poles".

Col. 20, line 23, amend "second" to - - first - - after "said".

Col. 20, line 24, amend "first" to - - second - - after "said".

Col. 20, line 41, amend "second" to - - first - - after "said".

Col. 20, line 56, insert - - , - - before "each of".

Signed and Sealed this

Seventeenth Day of January, 1995

Attest:

BRUCE LEHMAN

*Attesting Officer*  *Commissioner of Patents and Trademarks*